United States Patent
Deering

(10) Patent No.: US 6,483,504 B1
(45) Date of Patent: Nov. 19, 2002

(54) GRAPHICS SYSTEM HAVING A SUPER SAMPLED-SAMPLE BUFFER WITH EFFICIENT STORAGE OF SAMPLE POSITION INFORMATION

(75) Inventor: Michael F. Deering, Los Altos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/413,106

(22) Filed: Oct. 6, 1999

Related U.S. Application Data

(63) Continuation-in-part of application No. 09/251,453, filed on Feb. 17, 1999.
(60) Provisional application No. 60/074,836, filed on Feb. 17, 1998.

(51) Int. Cl.[7] .............................................. G07T 15/00

(52) U.S. Cl. ..................................................... 345/419

(58) Field of Search ................................. 345/419, 420, 345/421, 422, 423, 424, 426, 427, 428, 581, 589, 611, 612, 613, 614, 615, 629, 473

(56) References Cited

U.S. PATENT DOCUMENTS

| | | | |
|---|---|---|---|
| 5,117,289 A | | 5/1992 | Farley et al. |
| 5,287,438 A | * | 2/1994 | Kelleher ..................... 345/613 |
| 5,446,834 A | | 8/1995 | Deering |
| 5,481,669 A | * | 1/1996 | Poulton et al. ............. 345/505 |
| 5,594,854 A | | 1/1997 | Baldwin et al. |
| 5,619,438 A | | 4/1997 | Farley et al. |

(List continued on next page.)

FOREIGN PATENT DOCUMENTS

| | | |
|---|---|---|
| EP | 0 463 700 | 1/1992 |
| EP | 0 506 429 | 9/1992 |
| GB | 2 278 524 | 11/1994 |
| WO | 91/14995 | 10/1991 |

OTHER PUBLICATIONS

Patent Abstracts of Japan, Pub. No. 08063608, Pub. Date: Mar. 8, 1996.

(List continued on next page.)

*Primary Examiner*—Mark Zimmerman
*Assistant Examiner*—Enrique L. Santiago
(74) *Attorney, Agent, or Firm*—Jeffrey C. Hood

(57) ABSTRACT

A computer graphics system that utilizes a super-sampled sample buffer and a sample-to-pixel calculation unit for refreshing the display, wherein the graphics system may store sample position information as offsets to coordinates in the sample buffer. The graphics system may have a graphics processor, a super-sampled sample buffer, and a sample-to-pixel calculation unit. The graphics processor renders samples into the sample buffer at computed positions or locations in the sample buffer. The sample positions may be computed using various sample positioning schemes. The sample-to-pixel calculation unit uses the position information to select the samples for filtering during generation of output pixels. In one embodiment, for each sample, the position information comprises one or more offset values, such as an x-offset and a y-offset, wherein the offset values are relative to pre-defined locations in the sample buffer, such as pre-determined pixel center coordinates or predetermined bin coordinates. The position information may be stored in the sample buffer with the samples, or may be stored in a separate sample position memory coupled to the graphics processor. The samples may also be stored according to a bin ordering, wherein the bin ordering indicates a position of the samples in the respective bin. The sample-to-pixel calculation unit may use the bin ordering of the samples in the bins to index into a look-up table memory to determine the position information of the samples. The graphics system may include double buffered sample position memories.

76 Claims, 19 Drawing Sheets

U.S. PATENT DOCUMENTS

| | | | | |
|---|---|---|---|---|
| 5,638,176 A | | 6/1997 | Hobbs et al. | |
| 5,668,940 A | * | 9/1997 | Steiner et al. | 345/592 |
| 5,742,277 A | * | 4/1998 | Gossett et al. | 345/611 |
| 5,745,125 A | * | 4/1998 | Deering et al. | 345/426 |
| 5,757,375 A | * | 5/1998 | Kawase | 345/545 |
| 5,774,110 A | * | 6/1998 | Edelson | 345/601 |
| 5,793,371 A | | 8/1998 | Deering | |
| 5,999,187 A | * | 12/1999 | Dehmlow et al. | 345/420 |
| 6,046,744 A | * | 4/2000 | Hoppe | 345/419 |
| 6,070,500 A | * | 6/2000 | Foran et al. | 345/611 |
| 6,072,498 A | * | 6/2000 | Brittain et al. | 345/428 |
| 6,128,001 A | * | 10/2000 | Gonsalves et al. | 345/442 |
| 6,204,859 B1 | * | 3/2001 | Jouppi et al. | 345/422 |
| 6,313,838 B1 | * | 11/2001 | Deering | 345/420 |

OTHER PUBLICATIONS

Slater et al., "Simulating Peripheral Vision in Immersive Virtual Environments," Computer & Graphics, vol. 17, No. 6, Nov. 1993, pp. 643–653.

Upstill, *The RenderMan Companion*, © 1990 by Pixar, pp. 137–146, 171–178, 193–237, and 273–309.

Glassner, *Principles of Digital Image Synthesis*, vol. 1, © 1995 by Morgan Kaufman Publishers, Inc., pp. 243–244, 359–365.

Cosman, et al., "CIG Scene Realism: The World Tomorrow," © 1999 by Evans & Sutherland Computer Corporation, 18 pages.

Foley et al., *Computer Graphics, Principles and Practice, Second Edition In C*, © 1996 by Addison–Wesley Publishing Co., pp. 620, 643–645,788–791.

De Valois et al., *Spatial Vision*, © 1990 by Oxford University Press, pp. 38–60.

Bjernfalk, "The Memory System Makes the Difference," © 1999 by Evans & Sutherland Computer Corporation, pp. 1–11.

Written Opinion, application No. PCT/US 00/04147, mailed Nov. 20, 2000.

Bjernfalk, "Introducing *REALimage™ 4000* and the *HYPERpixel™* Architecture," © 1999 by Evans & Sutherland Computer Corporation, pp. 1–9.

International Search Report for Application No. PCT/US 00/04147, mailed May 29, 2000.

* cited by examiner

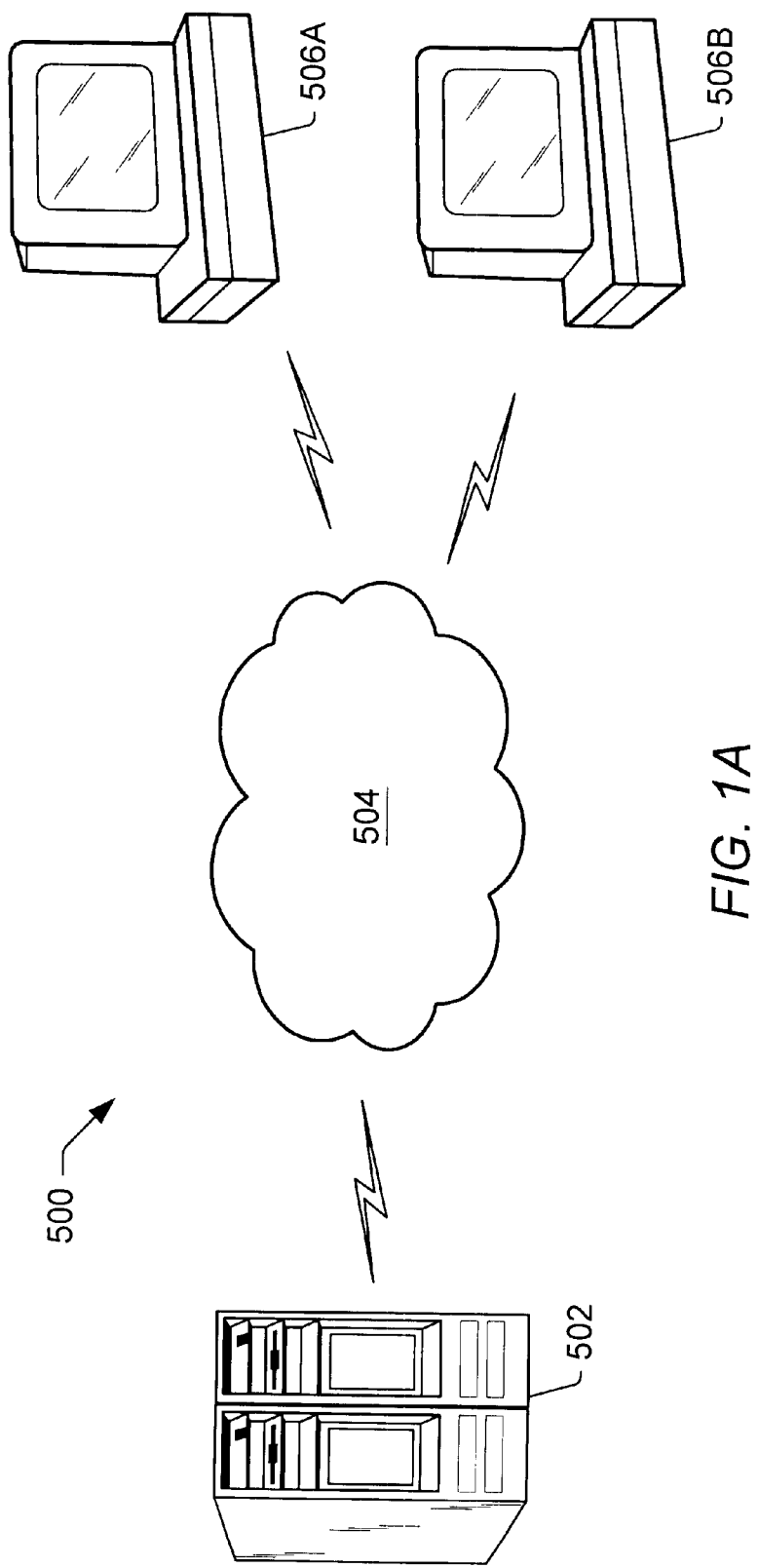

GRAPHICS SYSTEM HAVING A SUPER SAMPLED-SAMPLE BUFFER WITH EFFICIENT STORAGE OF SAMPLE POSITION INFORMATION

This application is a continuation-in-part of co-pending application Ser. No. 09/251,453 titled "Graphics System With Programmable Real-Time Sample Filtering", filed on Feb. 17, 1999, whose inventors are Michael F. Deering, David Naegle, and Scott Nelson, which claims the benefit of U.S. Provisional Application No. 60/074,836 filed Feb. 17, 1998.

BACKGROUND OF THE INVENTION

1. Field of the Invention

This invention relates generally to the field of computer graphics and, more particularly, to high performance graphics systems.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modem graphics systems, however, incorporate graphics processors with a great deal of processing power. They now act more like coprocessors rather than simple translators. This change is due to the recent increase in both the complexity and amount of data being sent to the display device. For example, modem computer displays have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating "draw a box at these coordinates." The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore are far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

The processing power of 3D graphics systems has been improving at a breakneck pace. A few years ago, shaded images of simple objects could only be rendered at a few frames per second, while today's systems support rendering of complex objects at 60 Hz or higher. At this rate of increase, in the not too distant future, graphics systems will literally be able to render more pixels than a single human's visual system can perceive. While this extra performance may be useable in multiple-viewer environments, it may be wasted in more common primarily single-viewer environments. Thus, a graphics system is desired which is capable of matching the variable nature of the human resolution system (i.e., capable of putting the quality where it is needed or most perceivable).

While the number of pixels is an important factor in determining graphics system performance, another factor of equal import is the quality of the image. For example, an image with a high pixel density may still appear unrealistic if edges within the image are too sharp or jagged (also referred to as "aliased"). One well-known technique to overcome these problems is anti-aliasing. Anti-aliasing involves smoothing the edges of objects by shading pixels along the borders of graphical elements. More specifically, anti-aliasing entails removing higher frequency components from an image before they cause disturbing visual artifacts. For example, anti-aliasing may soften or smooth high contrast edges in an image by forcing certain pixels to intermediate values (e.g., around the silhouette of a bright object superimposed against a dark background).

Another visual effect used to increase the realism of computer images is alpha blending. Alpha blending is a technique that controls the transparency of an object, allowing realistic rendering of translucent surfaces such as water or glass. Another effect used to improve realism is fogging. Fogging obscures an object as it moves away from the viewer. Simple fogging is a special case of alpha blending in which the degree of alpha changes with distance so that the object appears to vanish into a haze as the object moves away from the viewer. This simple fogging may also be referred to as "depth cueing" or atmospheric attenuation, i.e., lowering the contrast of an object so that it appears less prominent as it recedes. More complex types of fogging go beyond a simple linear function to provide more complex relationships between the level of translucence and an object's distance from the viewer. Current state of the art software systems go even further by utilizing atmospheric models to provide low-lying fog with improved realism.

While the techniques listed above may dramatically improve the appearance of computer graphics images, they also have certain limitations. In particular, they may introduce their own aberrations and are typically limited by the density of pixels displayed on the display device.

As a result, a graphics system is desired which is capable of utilizing increased performance levels to increase not only the number of pixels rendered but also the quality of the image rendered. In addition, a graphics system is desired which is capable of utilizing increases in processing power to improve the results of graphics effects such as anti-aliasing.

Prior art graphics systems have generally fallen short of these goals. Prior art graphics systems use a conventional frame buffer for refreshing pixel/video data on the display.

The frame buffer stores rows and columns of pixels that exactly correspond to respective row and column locations on the display. Prior art graphics system render 2D and/or 3D images or objects into the frame buffer in pixel form, and then read the pixels from the frame buffer during a screen refresh to refresh the display. Thus, the frame buffer stores the output pixels that are provided to the display. To reduce visual artifacts that may be created by refreshing the screen at the same time the frame buffer is being updated, most graphics systems' frame buffers are double-buffered.

To obtain more realistic images, some prior art graphics systems have gone further by generating more than one sample per pixel. As used herein, the term "sample" refers to calculated color information that indicates one or more of the color, depth (z), transparency, and potentially other information, of a particular point on an object or image. For example a sample may comprise the following component values: a red value, a green value, a blue value, a z value, and an alpha value (e.g., representing the transparency of the sample). A sample may also comprise other information, e.g., a z-depth value, a blur value, an intensity value, brighter-than-bright information, and an indicator that the sample consists partially or completely of control information rather than color information (i.e., "sample control information"). By calculating more samples than pixels (i.e., super-sampling), a more detailed image is calculated than can be displayed on the display device. For example, a graphics system may calculate four samples for each pixel to be output to the display device. After the samples are calculated, they are then combined or filtered to form the pixels that are stored in the frame buffer and then conveyed to the display device. Using pixels formed in this manner may create a more realistic final image because overly abrupt changes in the image may be smoothed by the filtering process.

These prior art super-sampling systems typically generate a number of samples that are far greater than the number of pixel locations on the display. These prior art systems typically have rendering processors that calculate the samples and store them into a render buffer. Filtering hardware then reads the samples from the render buffer, filters the samples to create pixels, and then stores the pixels in a traditional frame buffer. The traditional frame buffer is typically double-buffered, with one side being used for refreshing the display device while the other side is updated by the filtering hardware. Once the samples have been filtered, the resulting pixels are stored in a traditional frame buffer that is used to refresh the display device. These systems, however, have generally suffered from limitations imposed by the conventional frame buffer and by the added latency caused by the render buffer and filtering. Therefore, an improved graphics system is desired which includes the benefits of pixel super-sampling while avoiding the drawbacks of the conventional frame buffer.

U.S. patent application Ser. No. 09/251,453 titled "Graphics System With Programmable Real-Time Sample Filtering" discloses a computer graphics system that utilizes a super-sampled sample buffer and a sample-to-pixel calculation unit for refreshing the display. The graphics processor generates a plurality of samples and stores them into a sample buffer. The graphics processor preferably generates and stores more than one sample for at least a subset of the pixel locations on the display. Thus, the sample buffer is a super-sampled sample buffer which stores a number of samples that may be far greater than the number of pixel locations on the display. The sample-to-pixel calculation unit is configured to read the samples from the super-sampled sample buffer and filter or convolve the samples into respective output pixels, wherein the output pixels are then provided to refresh the display. The sample-to-pixel calculation unit selects one or more samples and filters them to generate an output pixel. The sample-to-pixel calculation unit may operate to obtain samples and generate pixels which are provided directly to the display with no frame buffer therebetween.

In a system with a super-sampled sample buffer and sample-to-pixel calculation units, the samples are calculated and stored at positions or locations in the sample buffer. Sample position information is stored for each sample which indicates the position or location of each sample in the sample buffer. This sample position information is created when the samples are rendered into the sample buffer, and the sample position information is used by the sample-to-pixel calculation unit in selecting samples for filtering. Due to the large number of samples stored in the sample buffer, improved techniques are desired for more efficiently storing position information of the samples in the sample buffer.

SUMMARY OF THE INVENTION

The present invention comprises a computer graphics system that utilizes a super-sampled sample buffer and a programmable sample-to-pixel calculation unit for refreshing the display, wherein the graphics system has improved storage of position information of the samples in the sample buffer. In one embodiment, the graphics system may have a graphics processor, a super-sampled sample buffer, and a sample-to-pixel calculation unit.

The graphics processor generates a plurality of samples and stores them into a sample buffer. The graphics processor preferably generates and stores more than one sample for at least a subset of the pixel locations on the display. Thus, the sample buffer is a super-sampled sample buffer which stores a number of samples that, in some embodiments, may be far greater than the number of pixel locations on the display. In other embodiments, the total number of samples may be closer to, equal to, or even less than the total number of pixel locations on the display device, but the samples may be more densely positioned in certain areas and less densely positioned in other areas.

The sample-to-pixel calculation unit is configured to read the samples from the super-sampled sample buffer and filter or convolve the samples into respective output pixels, wherein the output pixels are then provided to refresh the display. The sample-to-pixel calculation unit selects one or more samples and filters them to generate an output pixel. Note the number of samples selected and/or filtered by the sample-to-pixel calculation unit is typically greater than one.

The sample-to-pixel calculation unit may access the samples from the super-sampled sample buffer, perform a filtering operation, and then provide the resulting output pixels directly to the display, preferably in real-time. The graphics system may operate without a conventional frame buffer, i.e., the graphics system may not utilize a conventional frame buffer which stores the actual pixel values that are being refreshed on the display. Thus, the sample-to-pixel calculation units may calculate each pixel for each screen refresh on a real time basis or on an on-the-fly basis.

The graphics processor renders samples into the sample buffer at computed positions or locations in the sample buffer. The sample positions may be computed using various sample positioning schemes, such as a grid-based or stochastic position generation. The graphics processor may operate to calculate positions during rendering of samples into the sample buffer and utilize these calculated positions during rendering, and the graphics processor may also store the calculated position information for each of the samples. Alternatively, the graphics processor may use pre-computed position information. The position information indicates the position or location of the respective samples in the sample buffer. The position information may be programmable, such as on a per frame or per bin basis. The sample-to-pixel calculation unit uses the position information to select the samples for filtering during generation of output pixels.

In one embodiment, for each sample, the position information comprises one or more offset values, such as an x-offset and a y-offset, wherein the offset values are relative to pre-defined locations in the sample buffer. The one or more offset values may be offsets relative to a pre-defined grid in the sample buffer, such as pre-determined pixel center coordinates or pre-determined bin coordinates. For example, the samples may be stored in the sample buffer within bins, wherein each respective bin defines a region in the sample buffer in which samples in the respective bin are located, and the one or more offset values comprise offset values relative to a bin. Thus, the sample-to-pixel calculation unit may determine a position of each sample within a respective bin by using the one or more offset values associated with the sample and the sample's bin position.

The position information may be stored in the sample buffer with the samples, or may be stored in a separate sample position memory coupled to the graphics processor. In one embodiment, where the samples are stored in the sample buffer within bins, the samples are stored in the sample buffer according to a bin ordering, wherein the bin ordering indicates a position of the samples in the respective bin. In other words, the samples are stored in the sample buffer memory in an order corresponding to their respective relative positions in the bins. Thus, separate storage of sample position information may not be necessary, as the bin ordering of a sample in the sample buffer memory implies a position or offset of the sample. A look-up table memory may be included which stores position information, such as offsets, for each of the samples according to the bin ordering. The sample-to-pixel calculation unit may use the bin ordering of the samples in the bins to index into the look-up table memory to determine the position information of the samples.

In one embodiment, the look-up table memory stores a number of offset values which is less than the number of samples stored in the sample buffer. For example, the look-up table memory may store a number of offset values corresponding to only one bin of the sample buffer, wherein these offset values are reused for each bin of the sample buffer. The sample-to-pixel calculation unit may also manipulate bits in addresses to obtain different offset values for samples in respective bins.

The graphics system may include double buffered sample position memories, e.g., a first memory and a second memory which each are used to store position information for each of the samples. The graphics processor uses the first memory to access and/or store position information during rendering of samples into the sample buffer, while the sample-to-pixel calculation unit may contemporaneously use the second memory during generation of output pixels. Thus, the first memory may transfer current position information for a current frame to the second memory. The sample-to-pixel calculation unit may then use the second memory to determine the current position information of the samples, while the graphics processor contemporaneously stores position information for a subsequent frame into the first memory. Thus, the sample position memory may essentially be double buffered in this manner.

BRIEF DESCRIPTION OF THE DRAWINGS

The foregoing, as well as other objects, features, and advantages of this invention may be more completely understood by reference to the following detailed description when read together with the accompanying drawings in which:

FIG. 1A illustrates a computer network comprising at least one server computer and one or more client computers, wherein the client computers include one embodiment of a graphics system;

Figure 1:
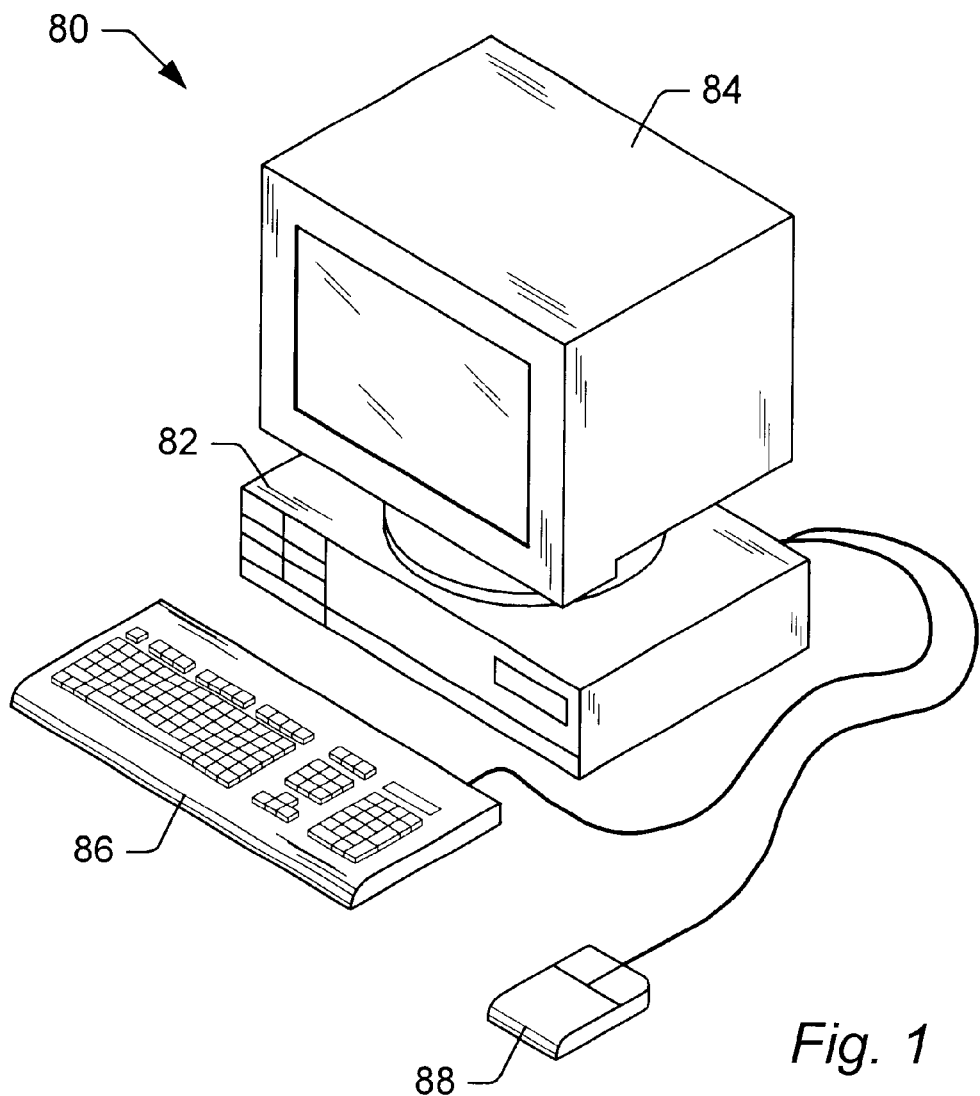
FIG. 1 illustrates one embodiment of a computer system that includes one embodiment of a graphics system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Incorporation by Reference

U.S. patent application Ser. No. 09/251,453 titled "Graphics System With Programmable Real-Time Sample Filtering", filed on Feb. 17, 1999, whose inventors are Michael F. Deering, David Naegle, and Scott Nelson, is hereby incorporated by reference as though fully and completely set forth herein.

Computer System—FIG. 1

Referring now to FIG. 1, one embodiment of a computer system 80 that includes a three-dimensional (3-D) graphics system is shown. The 3-D graphics system may be comprised in any of various systems, including a computer system, network PC, Internet appliance, a television, including HDTV systems and interactive television systems, personal digital assistants (PDAs), and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, body sensors, etc.). Application software may be executed by the computer system 80 to display 3-D graphical objects on display device 84.

As described further below, the 3-D graphics system in computer system 80 includes a super-sampled sample buffer with a programmable sample-to-pixel calculation unit to improve the quality and realism of images displayed on display device 84. The sample-to-pixel calculation unit may include a filter or convolve pipeline or other hardware for generating pixels in response to samples in the sample buffer. The sample-to-pixel calculation unit may operate to obtain samples from the sample buffer and generate pixels which are provided directly to the display. The sample-to-pixel calculation unit may operate in a "real-time" or "on-the-fly" fashion.

As used herein the terms "filter" and "convolve" are used interchangeably and refer to mathematically manipulating one or more samples to generate a pixel (e.g., by averaging, by applying a convolution function, by summing, by applying a filtering function, by weighting the samples and then manipulating them, by applying a randomized function, etc.).

As used herein, the term "real-time" refers to a function that is performed at or near the display device's refresh rate. "On-the-fly" means at, near, or above the human visual system's perception capabilities for motion fusion (how often a picture must be changed to give the illusion of continuous motion) and flicker fusion (how often light intensity must be changed to give the illusion of continuous). These concepts are further described in the book "Spatial Vision" by Russel L. De Valois and Karen K. De Valois, Oxford University Press, 1988.

The graphics system operates to render samples into the sample buffer at calculated positions. The graphics system may generate and store position information for each of the samples or may utilize pre-computed position information. According to one embodiment of the present invention, for each sample, the position information may comprise one or more offset values, such as an x-offset and a y-offset, wherein the offset values are relative to pre-defined locations in the sample buffer. The one or more offset values may be offsets relative to a pre-defined grid in the sample buffer, such as predetermined pixel center coordinates or bin coordinates in the sample buffer.

Computer Network—FIG. 1A

Referring now to FIG. 1A, a computer network 500 is shown comprising at least one server computer 502 and one or more client computers 506A-N. (In the embodiment shown in FIG. 1A, client computers 506A-B are depicted). One or more of the client systems may be configured similarly to computer system 80, with each having one or more graphics systems 112 as described above. Server 502 and client(s) 506 may be joined through a variety of connections 504, such as a local-area network (LAN), a wide-area network (WAN), or an Internet connection. In one embodiment, server 502 may store and transmit 3-D geometry data (which may be compressed) to one or more of clients 506. The clients 506 receive the compressed 3-D geometry data, decompress it (if necessary) and then render the geometry data. The rendered image is then displayed on the client's display device. The clients render the geometry data and display the image using super-sampled sample buffer and real-time filter techniques described herein. In another embodiment, the compressed 3-D geometry data may be transferred between client computers 506.

Figure 2:
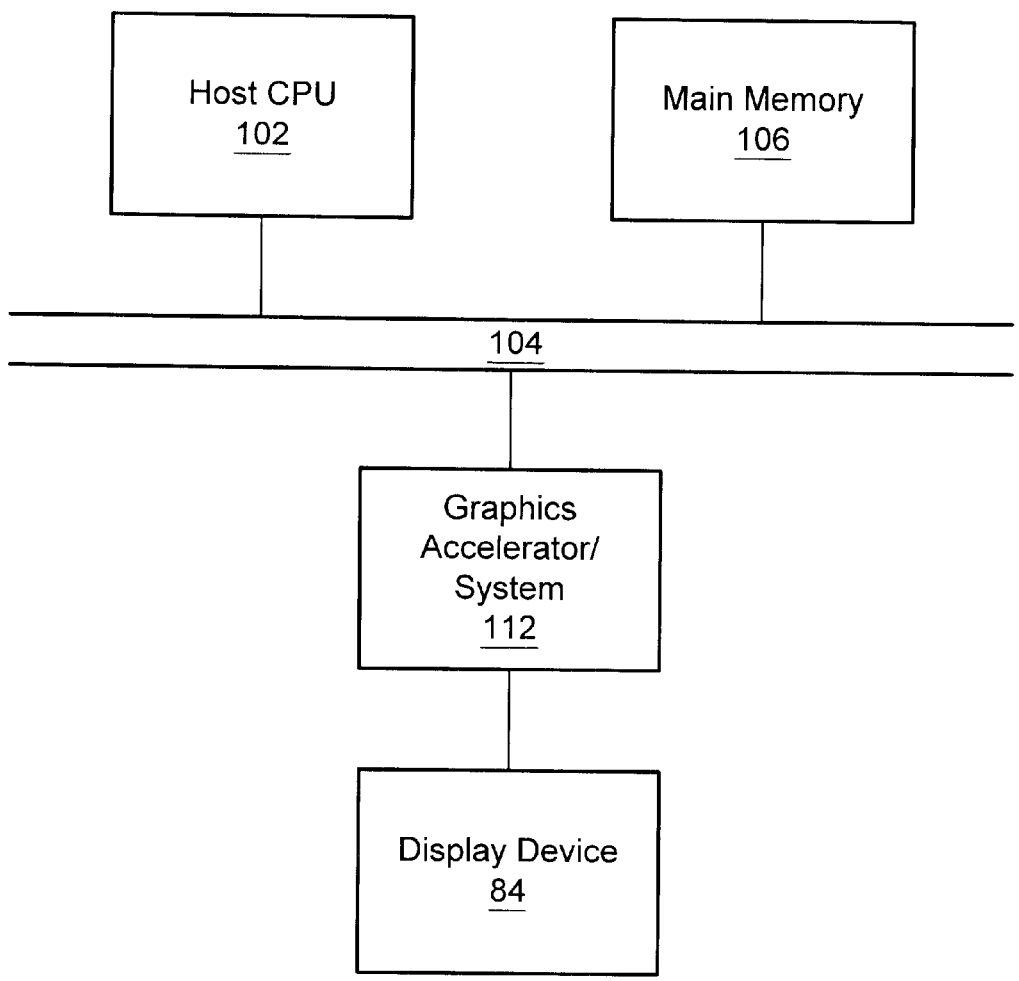
FIG. 2 is a simplified block diagram of the computer system of FIG. 1.

Computer System Block Diagram—FIG. 2

Referring now to FIG. 2, a simplified block diagram illustrating the computer system of FIG. 1 is shown. FIG. 2 may also illustrate the computers 506A, 506B, or 502. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs", synchronous dynamic random dom access memories or "SDRAMs", and Rambus dynamic access memories or "RDRAM", among others) and mass storage devices. The system bus or host bus 104 may comprise one or more communication or host computer buses (for communication between host processors, CPUs, and memory subsystems) as well as specialized subsystem buses.

A 3-D graphics system or graphics system 112 according to the present invention is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the 3-D graphics system may be coupled to one or more of the buses in computer system 80 and/or may be coupled to various types of buses. In addition, the 3D graphics system may be coupled to a communication port and thereby directly receive graphics data from an external source, e.g., the Internet or a network. As shown in the figure, display device 84 is connected to the 3-D graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer these graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

As will be described below, graphics system 112 may be configured to allow more efficient microcode control, which results in increased performance for handling of incoming color values corresponding to the polygons generated by host processor 102. Note while graphics system 112 is depicted as part of computer system 80, graphics system 112 may also be configured as a stand-alone device (e.g., with its own built-in display) or as part of another device, such as a PDA, television or any other device with display capabilities. Graphics system 112 may also be configured as a single chip device or as part of a system-on-a-chip or a multi-chip module.

Figure 3:
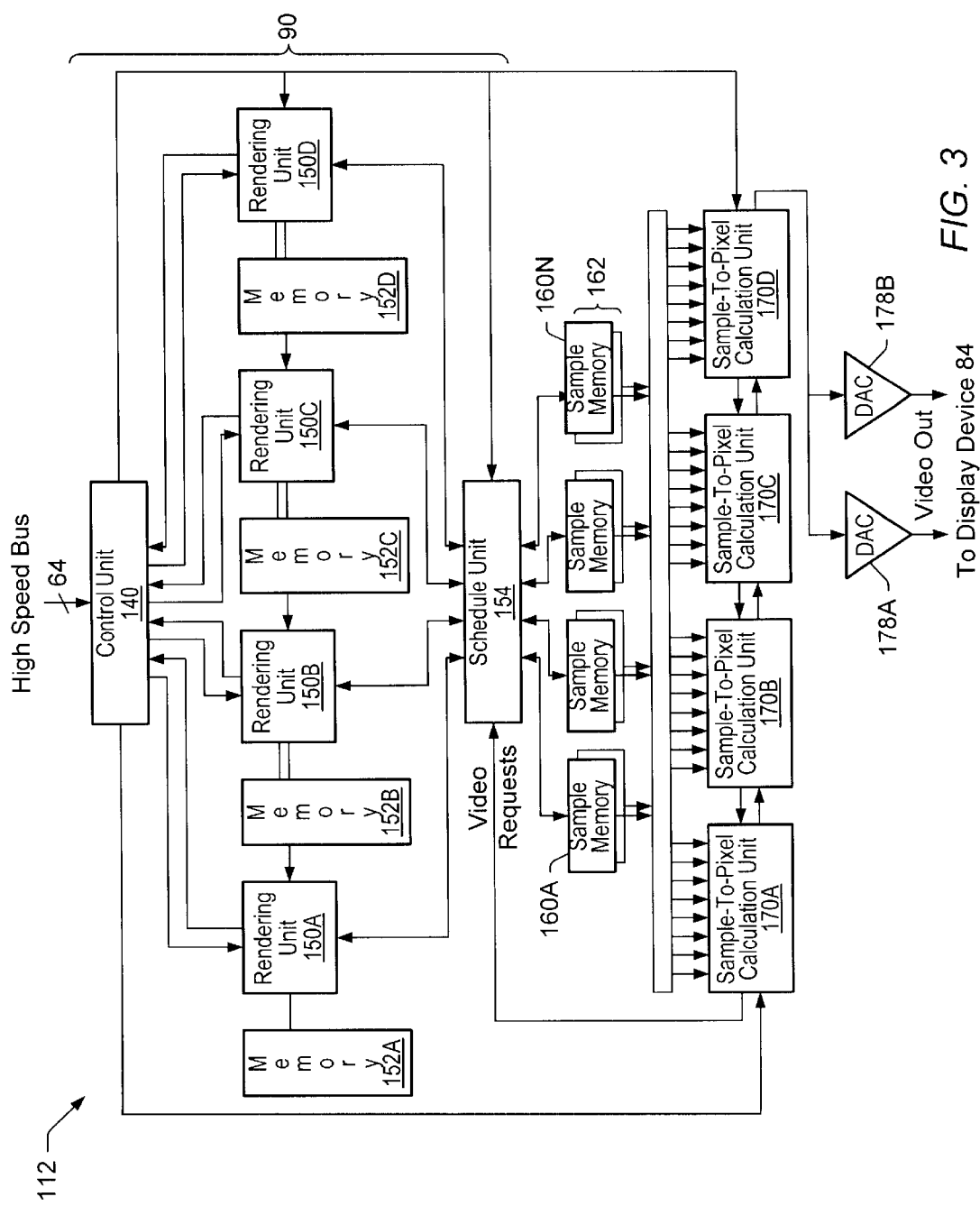
FIG. 3 is a block diagram illustrating more details of one embodiment of the graphics system of FIG. 1.

Graphics System—FIG. 3

FIG. 3 is a block diagram illustrating details of one embodiment of graphics system 112. As shown in the figure, graphics system 112 may comprise one or more graphics processors 90, one or more super-sampled sample buffers 162, and one or more sample-to-pixel calculation units 170A–D. Graphics system 112 may also comprise one or more digital-to-analog converters (DACs) 178A–B. Graphics processor 90 may be any suitable type of high performance processor (e.g., specialized graphics processors or calculation units, multimedia processors, DSPs, or general purpose processors). In one embodiment, graphics processor 90 may comprise one or more rendering units 150A–D. In the embodiment shown, however, graphics processor 90 also comprises one or more control units 140, one or more data memories 152A–D, and one or more schedule units 154. Sample buffer 162 may comprises one or more sample memories 160A–160N as shown in the figure.

A. Control Unit

Control unit 140 operates as the interface between graphics system 112 and computer system 80 by controlling the transfer of data between graphics system 112 and computer system 80. In embodiments of graphics system 112 that comprise two or more rendering units 150A–D, control unit 140 may also divide the stream of data received from computer system 80 into a corresponding number of parallel streams that are routed to the individual rendering units 150A–D. The graphics data may be received from computer system 80 in a compressed form. This may advantageously reduce the bandwidth requirements between computer system 80 and graphics system 112. In one embodiment, control unit 140 may be configured to split and route the data stream to rendering units 150A–D in compressed form.

The graphics data may comprise one or more graphics primitives. As used herein, the term graphics primitive includes polygons, parametric surfaces, splines, NURBS (non-uniform rational B-splines), sub-divisions surfaces, fractals, volume primitives, and particle systems. These graphics primitives are described in detail in the text book entitled "Computer Graphics: Principles and Practice" by James D. Foley, et al., published by Addison-Wesley Publishing Co., Inc., 1996. Note polygons are referred to throughout this detailed description for simplicity, but the embodiments and examples described may also be used with graphics data comprising other types of graphics primitives.

B. Rendering Units

Rendering units 150A–D (also referred to herein as draw units) are configured to receive graphics instructions and data from control unit 140 and then perform a number of functions, depending upon the exact implementation. For example, rendering units 150A–D may be configured to perform decompression (if the data is compressed), transformation, clipping, lighting, texturing, depth cueing, transparency processing, setup, and screen space rendering of various graphics primitives occurring within the graphics data. Each of these features is described separately below.

Depending upon the type of compressed graphics data received, rendering units 150A–D may be configured to perform arithmetic decoding, run-length decoding, Huffman decoding, and dictionary decoding (e.g., LZ77, LZSS, LZ78, and LZW). In another embodiment, rendering units 150A–D may be configured to decode graphics data that has been compressed using geometric compression. Geometric compression of 3D graphics data may achieve significant reductions in data size while retaining most of the image quality. Two methods for compressing and decompressing 3D geometry are described in U.S. Pat. No. 5,793,371, application Ser. No. 08/511,294, (filed on Aug. 4, 1995, entitled "Method And Apparatus For Geometric Compression Of Three-Dimensional Graphics Data,") and U.S. patent application Ser. No. 09/095,777, filed on Jun. 11, 1998, entitled "Compression of Three-Dimensional Geometry Data Representing a Regularly Tiled Surface Portion of a Graphical Object,"). In embodiments of graphics system 112 that support decompression, the graphics data received by each rendering unit 150 is decompressed into one or more graphics "primitives" which may then be rendered. The term primitive refers to components of objects that define its shape (e.g., points, lines, triangles, polygons in two or three dimensions, polyhedra, or free-form surfaces in three dimensions). Rendering units 150 may be any suitable type of high performance processor (e.g., specialized graphics processors or calculation units, multimedia processors, DSPs, or general purpose processors).

Transformation refers to manipulating an object and includes translating the object (i.e., moving the object to a different location), scaling the object (i.e., stretching or shrinking), and rotating the object (e.g., in three-dimensional space, or "3-space").

Clipping refers to defining the limits of the displayed image (i.e., establishing a clipping region, usually a rectangle) and then not rendering or displaying pixels that fall outside those limits.

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to actually calculate the data used to generate each pixel that will be displayed. In prior art systems, each pixel is calculated and then stored in a frame buffer. The contents of the frame buffer are then output to the display device to create the final image. In the embodiment of graphics system 112 shown in the figure, however, rendering units 150A–D calculate "samples" instead of actual pixel data. This allows rendering units 150A–D to "super-sample" or calculate more than one sample per pixel. Super-sampling is described in greater detail below. The rendering units 150A–D may also generate a greater area of samples than the viewable area of the display 84 for various effects such as panning and zooming. Note that rendering units 150A–B may comprises a number of smaller functional units, e.g., a separate set-up/decompress unit and a lighting unit.

More details on super-sampling are discussed in the following books: "Principles of Digital Image Synthesis" by Andrew Glassner, 1995, Morgan Kaufman Publishing (Volume 1); and "Renderman Companion:" by Steve Upstill, 1990, Addison Wesley Publishing.

C. Data Memories

Each rendering unit 150A–D may be coupled to an instruction and data memory 152A–D. In one embodiment, each data memory 152A–D may be configured to store both data and instructions for rendering units 150A–D. While implementations may vary, in one embodiment each data memory 152A–D may comprise two 8 MByte SDRAMs providing a total of 16 MBytes of storage for each rendering unit 150A–D. In another embodiment, RDRAMs (Rambus DRAMs) may be used to support the decompression and set-up operations of each rendering unit, while SDRAMs may be used to support the draw functions of rendering units 150A–D.

D. Schedule Unit

Schedule unit 154 may be coupled between the rendering units 150A–D and the sample memories 160A–N. Schedule unit 154 is configured to sequence the completed samples and store them in sample memories 160A–N. Note in larger configurations, multiple schedule units 154 may be used in parallel. In one embodiment, schedule unit 154 may be implemented as a crossbar switch.

E. Sample Memories

Super-sampled sample buffer 162 comprises sample memories 160A–160N, which are configured to store the plurality of samples generated by the rendering units. As used herein, the term "sample buffer" refers to one or more memories which store samples. As previously noted, samples are rendered into the sample buffer 162 at positions in the sample buffer which correspond to locations in screen space on the display. The positions may be calculated using various methods, such as grid-based position generation, stochastic position generation, or perturbed grid position generation, among others. The positions may be calculated or programmatically determined on a per frame basis, a per bin basis, or even a per sample basis. In one embodiment, sample position information is stored with the samples in the sample buffer.

One or more samples are then filtered to form each output pixel (i.e., pixels to be displayed on a display device). The number of samples stored may be greater than, equal to, or less than the total number of pixels output to the display device to refresh a single frame. Each sample may correspond to one or more output pixels. As used herein, a sample "corresponds" to an output pixel when the sample's information contributes to the final output value of the pixel. Note, however, that some samples may contribute zero to their corresponding output pixel after filtering takes place. Also, some samples may be rendered and stored in the sample buffer which are outside the viewable area of the display device 84 for one or more frames, wherein these samples may be used in subsequent frames for various display effects such as panning and zooming.

Stated another way, the sample buffer stores a plurality of samples that have positions that correspond to locations in screen space on the display, i.e., the samples contribute to one or more output pixels on the display. The number of stored samples may be greater than the number of pixel locations, and more than one sample may be combined in the convolution (filtering) process to generate a particular output pixel displayed on the display device. Any given sample may contribute to one or more output pixels.

Sample memories 160A–160N may comprise any of a number of different types of memories (e.g., SDRAMs, SRAMs, RDRAMs, 3DRAMs, or next-generation 3DRAMs) in varying sizes. In one embodiment, each schedule unit 154 is coupled to four banks of sample memories, wherein each bank comprises four 3DRAM-64 memories. Together, the 3DRAM-64 memories may form a 116-bit deep super-sampled sample buffer that stores multiple samples per pixel. For example, in one embodiment, each sample memory 160A–160N may store up to sixteen samples per pixel.

3DRAM-64 memories are specialized memories configured to support full internal double buffering with single buffered Z in one chip. The double buffered portion comprises two RGBX buffers, wherein X is a fourth channel that can be used to store other information (e.g., alpha). 3DRAM-64 memories also have a lookup table that takes in window ID information and controls an internal 2-1 or 3-1 multiplexer that selects which buffer's contents will be output. 3DRAM-64 memories are next-generation 3DRAM memories that may soon be available from Mitsubishi Electric Corporation's Semiconductor Group. In one embodiment, four chips used in combination are sufficient to create a double-buffered 1280×1024 super-sampled sample buffer. Since the memories are internally double-buffered, the input pins for each of the two frame buffers in the double-buffered system are time multiplexed (using multiplexers within the memories). The output pins may similarly be time multiplexed. This allows reduced pin count while still providing the benefits of double buffering. 3DRAM-64 memories further reduce pin count by not having z output pins. Since z comparison and memory buffer selection is dealt with internally, this may simplify sample buffer 162 (e.g., using less or no selection logic on the output side). Use of 3DRAM-64 also reduces memory bandwidth since information may be written into the memory without the traditional process of reading data out, performing a z comparison, and then writing data back in. Instead, the data may be simply written into the 3DRAM-64, with the memory performing the steps described above internally.

However, in other embodiments of graphics system 112, other memories (e.g., SDRAMs, SRAMs, RDRAMs, or current generation 3DRAMs) may be used to form sample buffer 162.

Graphics processor 90 may be configured to generate a plurality of sample positions according to a particular sample positioning scheme (e.g., a regular grid, a perturbed regular grid, stochastic, etc.). The sample position information for each of the samples may be stored for later use by the sample-to-pixel calculation unit(s). For example, the graphics processor 90 may store the sample position information in the sample buffer with the samples, or may store the sample position information in a separate sample position memory. Alternatively, the sample position information (e.g., offsets that are added to regular grid positions to form the sample positions) may be pre-determined or pre-computed using one of the above schemes and simply read from the sample position memory (e.g., a RAM/ROM table). The sample position information may be pre-computed by the graphics processor, by the host CPU, or by other logic.

The sample position information may comprise coordinate values relative to a sample buffer coordinate system, e.g., coordinate values relative to the display screen space. The sample position information may also comprise offset values, wherein the offset values are relative to pre-defined locations in the sample buffer, such as a pre-defined regular grid, pre-defined bins, or pixel center coordinates.

Upon receiving a polygon that is to be rendered, graphics processor 90 determines which samples reside within the polygon based upon the sample position information. Graphics processor 90 renders the samples that fall within the polygon and stores rendered samples in sample memories 160A–N. Note as used herein the terms render and draw are used interchangeably and refer to calculating values for samples, including one or more of color values, depth values, alpha values, blur values, and other per-sample values.

F. Sample-to-pixel Calculation Units

Sample-to-pixel calculation units 170A–D (sometimes collectively referred to as sample-to-pixel calculation unit 170) may be coupled between sample memories 160A–N and DACs 178A–B. Sample-to-pixel calculation units 170A–D are configured to read selected samples from sample memories 160A–N, wherein the samples are selected based on the position information of the samples, and then perform a convolution (e.g., a filtering and weighting function or a low pass filter) on the samples to generate the output pixel values which are output to DACs 178A–B. The sample-to-pixel calculation units 170A–D may be programmable to allow them to perform different filter functions at different times, depending upon the type of output desired. In one embodiment, the sample-to-pixel calculation units 170A–D may implement a 5×5 super-sample reconstruction band-pass filter to convert the super-sampled sample buffer data (stored in sample memories 160A–N) to single pixel values. In other embodiments, calculation units 170A–D may filter a selected number of samples to calculate an output pixel. The filtered samples may be multiplied by a variable weighting factor that gives more or less weight to samples having positions close to the center of the pixel being calculated. Other filtering functions may also be used either alone or in combination, e.g., tent filters, circular and elliptical filters, Mitchell filters, band pass filters, sync function filters, etc.

Sample-to-pixel calculation units 170A–D may also be configured with one or more of the following features: color look-up using pseudo color tables, direct color, inverse gamma correction, filtering of samples to pixels, and conversion of pixels to non-linear light space. Other features of sample-to-pixel calculation units 170A–D may include programmable video timing generators, programmable pixel clock synthesizers, and crossbar functions. Once the sample-to-pixel calculation units have manipulated the timing and color of each pixel, the pixels are output to DACs 178A–B.

G. DACs

DACs 178A–B operate as the final output stage of graphics system 112. The DACs 178A–B serve to translate the digital pixel data received from cross units 174A–B into analog video signals that are then sent to the display device. Note in one embodiment DACs 178A–B may be bypassed or omitted completely in order to output digital pixel data in lieu of analog video signals. This may be useful when display device 84 is based on a digital technology (e.g., an LCD-type display or a digital micro-mirror display).

Figure 4:
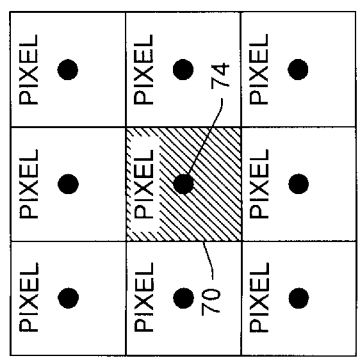
FIG. 4 illustrates traditional pixel calculation.

Super—Sampling FIGS. 4–5

FIG. 4 illustrates an example of traditional, non-super-sampled pixel value calculation. Each pixel has exactly one data point calculated for it, and the single data point is located at the center of the pixel. For example, only one data point (i.e., sample 74) contributes to value of pixel 70.

Figure 5B:
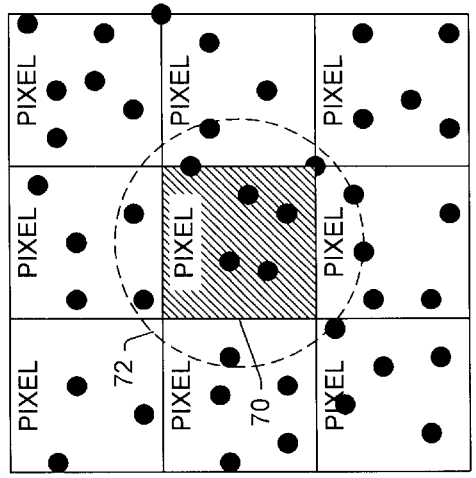
FIG. 5B illustrates a random distribution of samples.
Figure 5A:
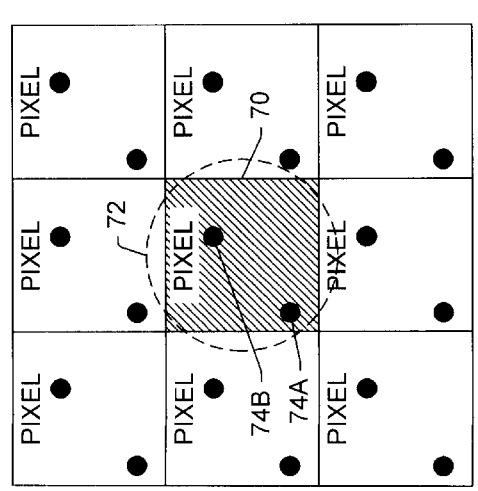
FIG. 5A illustrates one embodiment of super-sampling.

Turning now to FIG. 5A, an example of one embodiment of super-sampling is illustrated. In this embodiment, a number of samples are calculated. The number of samples may be related to the number of pixels or completely independent of the number of pixels. In this example, 18 samples are distributed in a regular grid across nine pixels. Even with all the samples present in the figure, a simple one to one correlation could be made (e.g., by throwing out all but the sample nearest to the center of each pixel). However, the more interesting case is performing a filtering function on multiple samples to determine the final pixel values. Also, as noted above, a single sample can be used to generate a plurality of output pixels, i.e., sub-sampling.

A circular filter 72 is illustrated in the figure. In this example, samples 74A–B both contribute to the final value of pixel 70. This filtering process may advantageously improve the realism of the image displayed by smoothing abrupt edges in the displayed image (i.e., performing anti-aliasing). Filter 72 may simply average samples 74A–B to form the final value of output pixel 70, or it may increase the contribution of sample 74B (at the center of pixel 70) and diminish the contribution of sample 74A (i.e., the sample farther away from the center of pixel 70). Circular filter 72 is repositioned for each output pixel being calculated so the center of filter 72 coincides with the center position of the pixel being calculated. Other filters and filter positioning schemes are also possible and contemplated.

Turning now to FIG. 5B, another embodiment of super-sampling is illustrated. In this embodiment, however, the samples are positioned randomly. More specifically, different sample positions are selected and provided to graphics processor 90 (and render units 150A–D), which calculate color information to form samples at these different locations. Thus the number of samples falling within filter 72 may vary from pixel to pixel.

Super-Sampled Sample Buffer with Real-Time Convolution—FIGS. 6–13

FIGS. 6A, 6B, 7A and 7B illustrate possible configurations for the flow of data through one embodiment of graphics system 112. As the figures show, geometry data 350 is received by graphics system 112 and used to perform draw or render process 352. The draw process 352 is implemented by one or more of control unit 140, rendering units 150, memories 152, and schedule unit 154. Geometry data 350 comprises data for one or more polygons. Each polygon comprises a plurality of vertices (e.g., three vertices in the case of a triangle), some of which may be shared. Data such as x, y, and z coordinates, color data, lighting data and texture map information may be included for each vertex.

The draw process 352 may also generate sample coordinates or sample position information for rendering of samples, or may receive pre-computed sample position information from a sample position memory 354. As used herein, the term "sample position information" or simply "position information" refers to information which indicates or specifies positions or locations of samples rendered into the sample buffer 162, wherein the positions or locations in the sample buffer 162 are generally relative to or correspond to positions or locations in a screen space of the display. In general, the terms "position" and "position information" are used interchangeably. The terms sample position information" or simply "position information" may include relative position and/or relative time information. For example, the position information may comprise an x,y value as well as a temporal value which may indicate a sub-frame time offset. The sub-frame time offset may indicate the relative camera time at which the sample information was generated or rendered.

As discussed above, sample positions may be generated according to a particular sample positioning scheme. Example sample positioning schemes include a regular grid (e.g., regular square grid or a regular hexagonal grid), a perturbed regular grid, or stochastic position generation, among others. Graphics system 112 may receive an indication from the operating system, device driver, or the geometry data 350 that indicates which type of sample positioning scheme is to be used. Thus the graphics system 112 (e.g., graphics processor 90) is configurable or programmable to generate position information according to one or more different schemes. More detailed information on several sample position schemes are described further below (see description of FIG. 8).

Graphics processor 90 executing draw process 352 utilizes sample position information during rendering. The graphics processor 90 may be configured to generate the plurality of sample positions (position information) during rendering, or the sample positions may be generated by a graphics driver executing on the host CPU, or by other logic. The sample positions may also be pre-computed and stored in the sample position memory 354 for later use during rendering, wherein the position information is pre-computed by one of the graphics processor 90, host CPU, or other logic. Thus the draw process 352, or other hardware or software, may generate the plurality of sample positions in real time during the rendering process and then store the position information in the sample position memory 354, or the sample positions may be pre-computed and stored in the sample position memory 354 for later use during rendering.

Figure 6A:
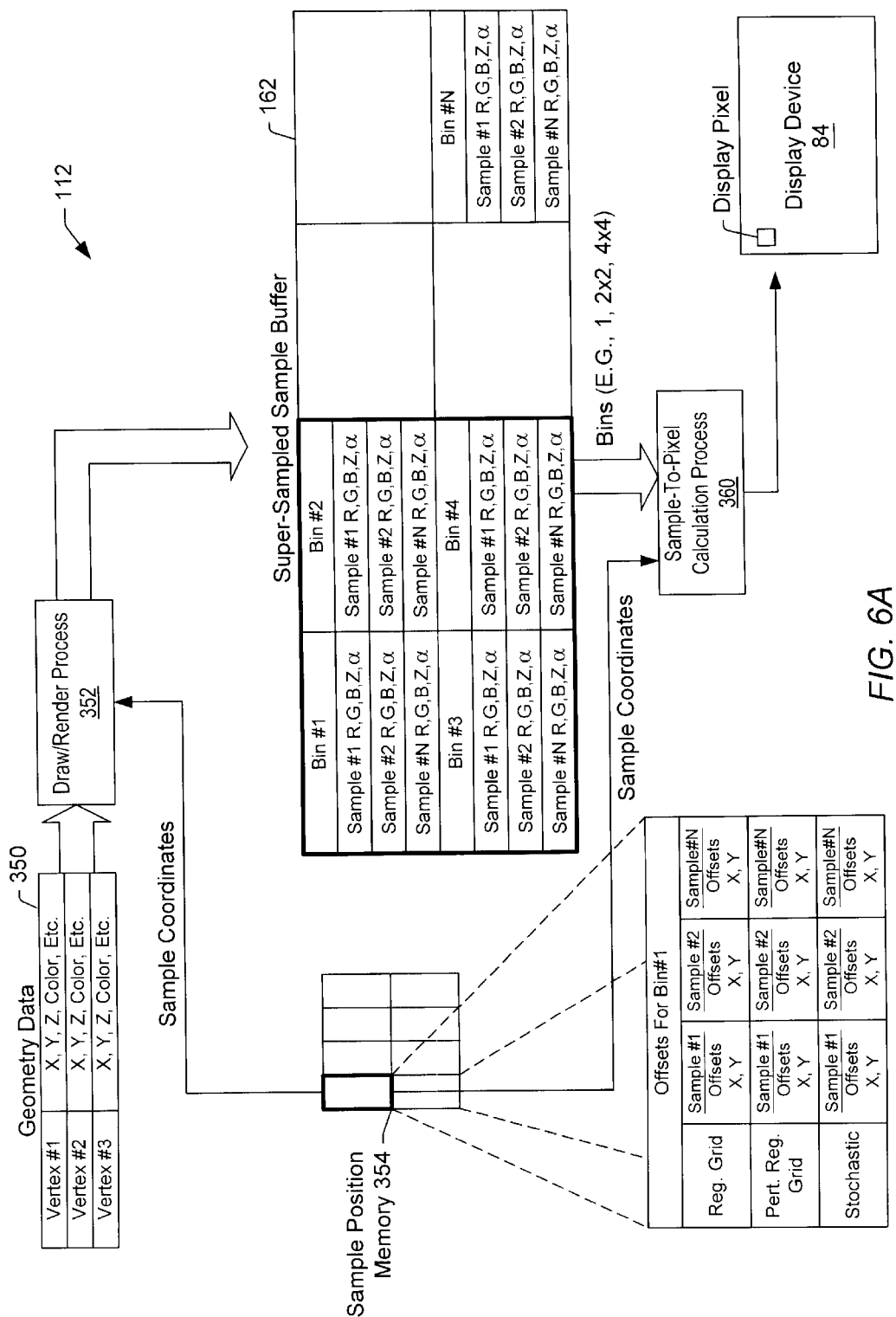
FIG. 6A illustrates one embodiment of a graphics system having a super-sampled sample buffer and having a single sample position memory.
Figure 6B:
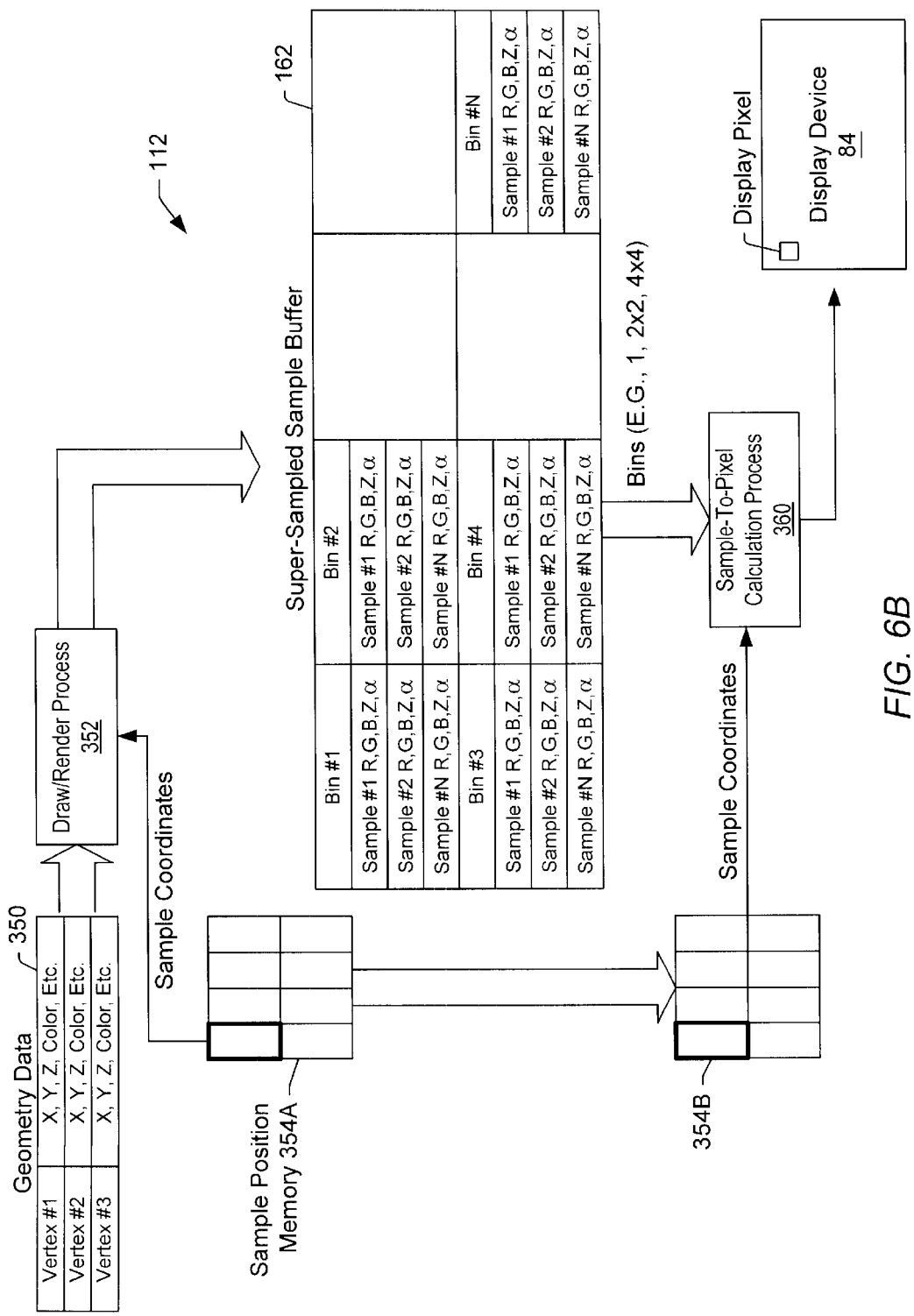
FIG. 6B illustrates another embodiment of a graphics system having a super-sampled sample buffer and including a double buffered sample position memory.

As shown in FIGS. 6A and 6B, the sample position information may be stored in a separate sample position memory 354. For example, the sample position information (e.g., offsets that are added to regular grid positions to form the sample positions) may be pre-determined or pre-computed using one of the above schemes and read from the sample position memory 354 (e.g., a RAM/ROM table) during rendering. The sample positions may be pre-computed by the graphics processor 90, by the host CPU, or by other logic as noted above. Alternatively, the graphics processor 90 may generate the sample position information during rendering and store the sample position information in the sample position memory 354.

In one embodiment, position memory 354 is embodied within rendering units 150A–D. In another embodiment, position memory 354 may be realized as part of texture and render memories 152A–152D, or as a separate memory. Sample position memory 354 is configured to store position information for samples that are calculated in draw process 352 and then stored into super-sampled sample buffer 162.

The sample position memory 354 may comprise a single memory (FIG. 6A) or may comprise two memories (FIG. 6B), e.g., a double buffered configuration. The double buffered sample position memories 354A and 354B allow for programmability of the sample position information, such as on a per frame or per bin basis, or a per sample basis. The double buffered embodiment of FIG. 6B is discussed further below.

Figure 7A:
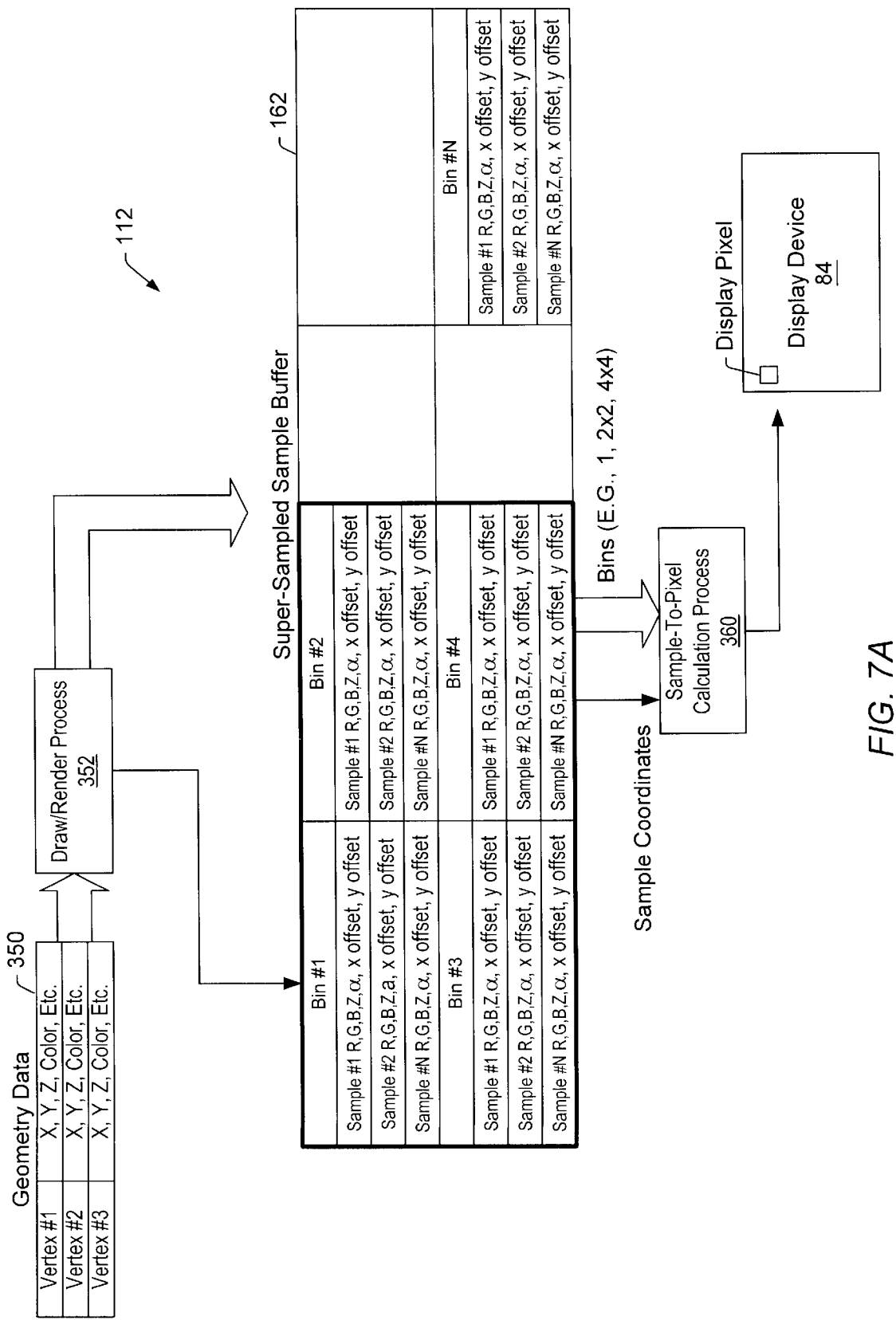
FIG. 7A illustrates one embodiment of a graphics system having a super-sampled sample buffer, wherein sample position information is stored in the sample buffer.
Figure 7B:
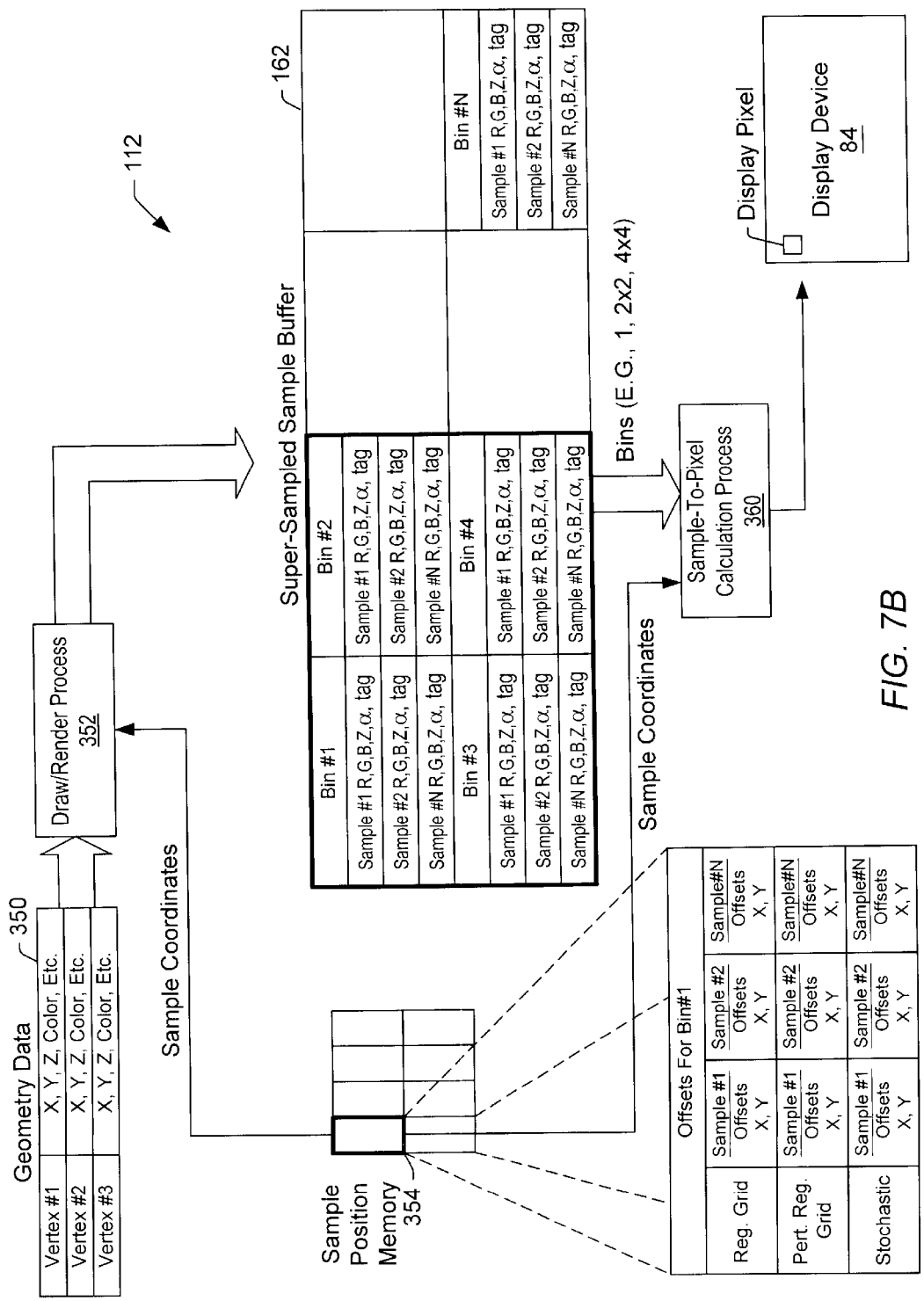
FIG. 7B illustrates another embodiment of a graphics system having a super-sampled sample buffer, wherein sample position information tags are stored in the sample buffer which reference offsets stored in a separate sample position memory.

The sample position information may also be stored in the sample buffer 162 with the samples, as shown in FIG. 7A. For example, the graphics processor 90 may generate the sample position information during rendering and store the sample position information with the samples in the sample buffer 162. Since the sample buffer 162 is already double buffered, storage of the sample position information in the sample buffer 162 effectively double buffers the sample position information. FIG. 7B illustrates an embodiment where look-up table (LUT) tags or indices are stored with the samples in the sample buffer 162, wherein these tags reference offsets stored in a separate sample position memory 354. The embodiments of FIGS. 7A and 7B are discussed further below.

In one embodiment, the sample position information may comprise entire sample position "addresses" or coordinates. However, this may involve increasing the size of position memory 354 (FIGS. 6A, 6B and 7B) or may involve increasing the size of the sample buffer (FIG. 7A). Alternatively, the sample position information may comprise only one or more offsets for each sample. Storing only the offsets may use less storage space than storing each sample's entire position. The one or more offset values may comprise x- and y-offsets or angular and distance offsets (polar coordinates), among others.

The one or more offset values may comprise offset values relative to a pre-defined regular grid, e.g., may be relative to pre-determined bin coordinates or pre-determined pixel center coordinates. For example, the one or more offset values may be relative to the bin in which the sample is located, such as the lower left corner of the bin. The offsets may be based on any of the various sample position schemes discussed above.

The sample position of a sample may be determined by combining the one or more offset values of the sample with the reference coordinates, e.g., coordinates from a regular grid, pre-determined bin coordinates, or pre-determined pixel center coordinates, among others. The offset values stored in sample position memory 354 or in the sample buffer 162 may be read by each of the graphics processor 90 and/or the sample-to-pixel calculation unit 170 and processed to calculate sample positions for the samples. Alternatively, the offset values stored in sample position memory 354 may be read by a dedicated sample position calculation unit (not shown) and processed to calculate example sample positions for graphics processor 90 and/or for sample-to-pixel calculation unit 170. More detailed information on sample position offsets is included below (see description of FIGS. 9 and 10).

As mentioned above, the graphics system may include sample position memory 354 coupled to the sample-to-pixel calculation unit 170 which stores the offset values for each of the samples. As shown in FIGS. 6A, 6B and 7B, the sample-to-pixel calculation unit 170 is operable to access the memory 354 to determine the offset values of the samples. The memory 354 may be a look-up table memory, wherein the sample-to-pixel calculation unit 170 is operable to index into the look-up table memory 354 to determine the offset values of the samples.

The memory 354 is addressable using addresses. In one embodiment, the memory 354 stores a number of offset values which is less than the number of samples stored in the sample buffer 162. In this embodiment, the sample-to-pixel calculation unit 170 may reuse offset values for different bins in the sample buffer 162. However, this may product artifacts due to the same offsets being used for neighboring bins (or all of the bins). In another embodiment, the sample-to-pixel calculation unit 170 manipulates bits in the addresses to obtain different offset values for samples. This manipulation of bits may include adding bits, combining bits, hashing bits, adding modulos of bits, using various hashing functions, possible in conjunction with look-up tables, or otherwise manipulating the bits. Stated another way, the sample position memory may be programmable to access or "unfold" the sample position memory table 354 in a number of different ways. This may allow a smaller memory table 354 to be used with reduced visual artifacts caused by repeating sample position offsets.

As one example, sample position memory 354 may be configured to store a table of random numbers. Sample position memory 354 may also comprise dedicated hardware to generate one or more different types of regular grids. This hardware may be programmable. The stored random numbers may be added as offsets to the regular grid positions generated by the hardware.

In one embodiment, the sample position memory may be programmable to access or "unfold" the random number table in a number of different ways as described above, thus allowing a smaller table to be used with reduced visual artifacts. In one embodiment, the random numbers may be repeatable or repeatably generated, thereby allowing draw process 352 and sample-to-pixel calculation process 360 to utilize the same offset for the same sample without necessarily storing each offset.

The samples may be stored in the sample buffer 162 according to bins, wherein each respective bin defines a region in the sample buffer 162 in which samples in the respective bin are located. As used herein, the term "bin" refers to a region or area in screen-space and contains however many samples are in that area (e.g., the bin may be 1×1 pixels in area, 2×2 pixels in area, etc.). The term "screen space" refers generally to the coordinate system of the display device. The use of bins may simplify the storage and access of samples in sample buffer 162. A number of different bin sizes may be used (e.g., one sample per bin, four samples per bin, etc.). In the preferred embodiment, each bin has an xy-position that corresponds to a particular location on the display. The bins are preferably regularly spaced. In this embodiment the bins' xy-positions may be determined from the bin's storage location within sample buffer 162. The bins' positions correspond to particular positions on the display. In some embodiments, the bin positions may correspond to pixel centers, while in other embodiments the bin positions correspond to points that are located between pixel centers.

The one or more offset values may comprise offset values relative to a bin. Thus a position of each sample within a respective bin may be determined by using the one or more offset values associated with the sample and the sample's bin position. As one example, position memory 354 may store pairs of 8-bit numbers, each pair comprising an x-offset and a y-offset (other offsets are also possible, e.g., a time offset, a z-offset, polar coordinate offsets, etc.). When added to a bin position, each pair defines a particular position in screen space. To improve read times, memory 354 may be constructed in a wide/parallel manner so as to allow the memory to output more than one sample location per clock cycle.

In one embodiment, the samples are stored in the sample buffer 162 according to a bin ordering, wherein, for a respective bin, the bin ordering indicates a position of the samples in the respective bin. Thus, for a respective sample, the sample-to-pixel calculation unit 170 is operable to generate the position of the respective sample based at least partly on the bin ordering of the respective sample within its bin. For example, the offset values may be stored in the memory 354 according to the bin ordering of the samples, and the sample-to-pixel calculation unit 170 is operable to use the bin ordering of the samples in the bins to index into the memory 354 to determine the offset values of the samples. The sample position memory 354 may store a number of offset values less than the total number of samples in the sample buffer. For example, the sample position memory 354 may store a number of offset values corresponding to only one bin of the sample buffer 162. In this instance, the sample-to-pixel calculation unit 170 is operable to reuse these offset values for each bin of the sample buffer 162. The sample-to-pixel calculation unit 170 may operate to manipulate bits in the sample position memory addresses to obtain different offset values for samples in the bins as described above.

In one embodiment, sample position memory 354 may comprise a RAM/ROM that contains stochastic sample points (or locations) for different total sample counts per bin. A number of different bin sizes may be used (e.g., one sample per bin, four samples per bin, etc.). The specific position of each sample within a bin may be determined by looking up the sample's offset in the RAM/ROM table (the offsets may be stored relative to the corresponding bin position). However, depending upon the implementation, not all bin sizes may have a unique RAM/ROM entry. Some bin sizes may simply read a subset of the larger bin sizes' entries. In one embodiment, each supported size has at least four different sample position scheme variants, which may reduce final image artifacts due to repeating sample positions.

Once the sample positions have been read from sample position memory 354, draw process 352 selects the samples positions that fall within the polygon currently being rendered. Draw process 352 then calculates the z and color information (which may include alpha or other depth of field information values) for each of these samples and stores the data into sample buffer 162. In one embodiment, the sample buffer may only single-buffer z values (and perhaps alpha values) while double buffering other sample components such as color. Unlike prior art systems, graphics system 112 may double buffer all samples (although not all sample components may be double-buffered, i.e., the samples may have components that are not double-buffered, or not all samples may be double-buffered). In one embodiment, the samples are stored into sample buffer 162 in bins. In some embodiments, the size of bins, i.e., the quantity of samples within a bin, may vary from frame to frame and may also vary across different regions of display device 84 within a single frame. For example, bins along the edges of display device may comprise only one sample, while bins corresponding to pixels near the center of display device 84 may comprise sixteen samples. Note the area of bins may vary from region to region. The use of bins will be described in greater detail below in connection with FIG. 11.

In parallel and preferably independently of draw process 352, filter process 360 is configured to read samples from sample buffer 162, filter (i.e., filter) them, and then output the resulting output pixel to display device 84. Sample-to-pixel calculation units 170 implement filter process 380. Thus, for at least a subset of the output pixels, the filter process is operable to filter a plurality of samples to produce a respective output pixel. In one embodiment, filter process 360 is configured to: (i) determine the distance from each sample to the center of the output pixel being filtered; (ii) multiply the sample's components (e.g., color and alpha) with a filter value that is a specific (programmable) function of the distance; (iii) sum all the weighted samples that contribute to the output pixel, and (iv) normalize the resulting output pixel. The filter process 360 is described in greater detail below (see description accompanying FIGS. 11, 12, and 14). Note the extent of the filter need not be circular (i.e., it may be a function of x and y instead of the distance), but even if the extent is, the filter need not be circularly symmetrical. The filter's "extent" is the area within which samples can influence the particular pixel being calculated with the filter.

FIG. 6B—Double Buffered Sample Position Memories

FIG. 6B illustrates an alternate embodiment of graphics system 112, wherein two or more sample position memories 354A and 354B are utilized. As shown in FIG. 6B, the graphics includes a first sample position memory 354A and a second sample position memory 354B. The first sample position memory 354A is coupled to the graphics processor 90 and stores the position information for each of the samples. The graphics processor 90 uses the first memory 354A in rendering the samples into the sample buffer 162. As discussed above, the graphics processor 90 may also operate to generate and store the sample position information in the memory 354A. The second sample position memory 354B is coupled to the sample-to-pixel calculation unit 170 and also stores the position information for each of the samples. The sample-to-pixel calculation unit 170 is operable to access the second memory 354B to determine the position information of the samples. The sample-to-pixel calculation unit 170 uses the position information obtained from the second memory 354B to aid in selecting samples for filtering.

As shown, the first sample position memory 354A is configured to provide sample position information to the second sample position memory 354B, thus effectively providing a double buffered configuration. For example, the first memory 354A is operable to transfer current position information for a current frame to the second memory 354B. The sample-to-pixel calculation unit 170 is operable to use the second memory 354B to determine the current position information of the samples. Meanwhile, the graphics processor is operable to store subsequent position information for a subsequent frame into the first memory 354A contemporaneously with the sample-to-pixel calculation unit 170 using the second memory 354B to determine the current position information of the samples for the current frame.

Thus, the sample position memories 354A–B are essentially double-buffered. If the sample positions are kept the same from frame to frame, then the sample positions may be single buffered. However, if the sample positions may vary from frame to frame, then graphics system 112 may be advantageously configured to double-buffer the sample positions. The sample positions may be double buffered with one buffer on the rendering side (i.e., memory 354A) and one buffer on the filter/convolve side (i.e., memory 354B). The sample positions may also be double buffered on the rendering side (i.e., memory 354A may be double buffered) and or the filter/convolve side (i.e., memory 354B may be double buffered). Other combinations are also possible. For example, memory 354A may be single-buffered, while memory 354B is doubled buffered. This configuration may allow one side of memory 354B to be used for refreshing (i.e., by filter/convolve process 360) while the other side of memory 354B is being updated.

In this configuration, graphics system 112 may change sample position schemes on a per-frame basis by shifting the sample positions (or offsets) from memory 354A to double-buffered memory 354B as each frame is rendered. Thus, the positions used to calculate the samples (read from memory 354A) are copied to memory 354B for use during the filtering process (i.e., the sample-to-pixel conversion process). Once the position information has been copied to memory 354B, position memory 354A may then be loaded with new sample position offsets to be used for the second frame to be rendered. In this way the sample position information follows the samples from the draw/render process to the filter process.

FIG. 7A illustrates an embodiment where the sample position information may also be stored in the sample buffer 162 with the samples, as noted above. For example, the graphics processor 90 may generate the sample position information during rendering and store the sample position information with the samples in the sample buffer 162. Since the sample buffer 162 is already double buffered, storage of the sample position information in the sample buffer 162 effectively double buffers the sample position information. In the embodiment of FIG. 7A, the graphics processor 90 stores the offset values with the samples themselves in the super-sampled sample buffer 162. In this instance, a separate sample position memory 354 may not be required.

FIG. 7B illustrates an embodiment where the graphics processor 90 stores tags to offsets with the samples themselves in the super-sampled sample buffer 162. These tags may be used to look-up the position information, such as an offset/perturbation or full position coordinates, associated with each particular sample, wherein the position information may be stored in separate memory 354. In other words, these tags may be used to index into a look-up table stored in sample position memory 354. Thus this embodiment stores look-up table tags or indices with the samples in the sample buffer 162, and these tags are accessed and used to index into the look-up table 354 to obtain the appropriate offset for the sample. Thus, this implementation would use the sample position memory 354 to store the position information (e.g., offsets) as shown in FIG. 7B.

Sample Positioning Schemes

Figure 8:
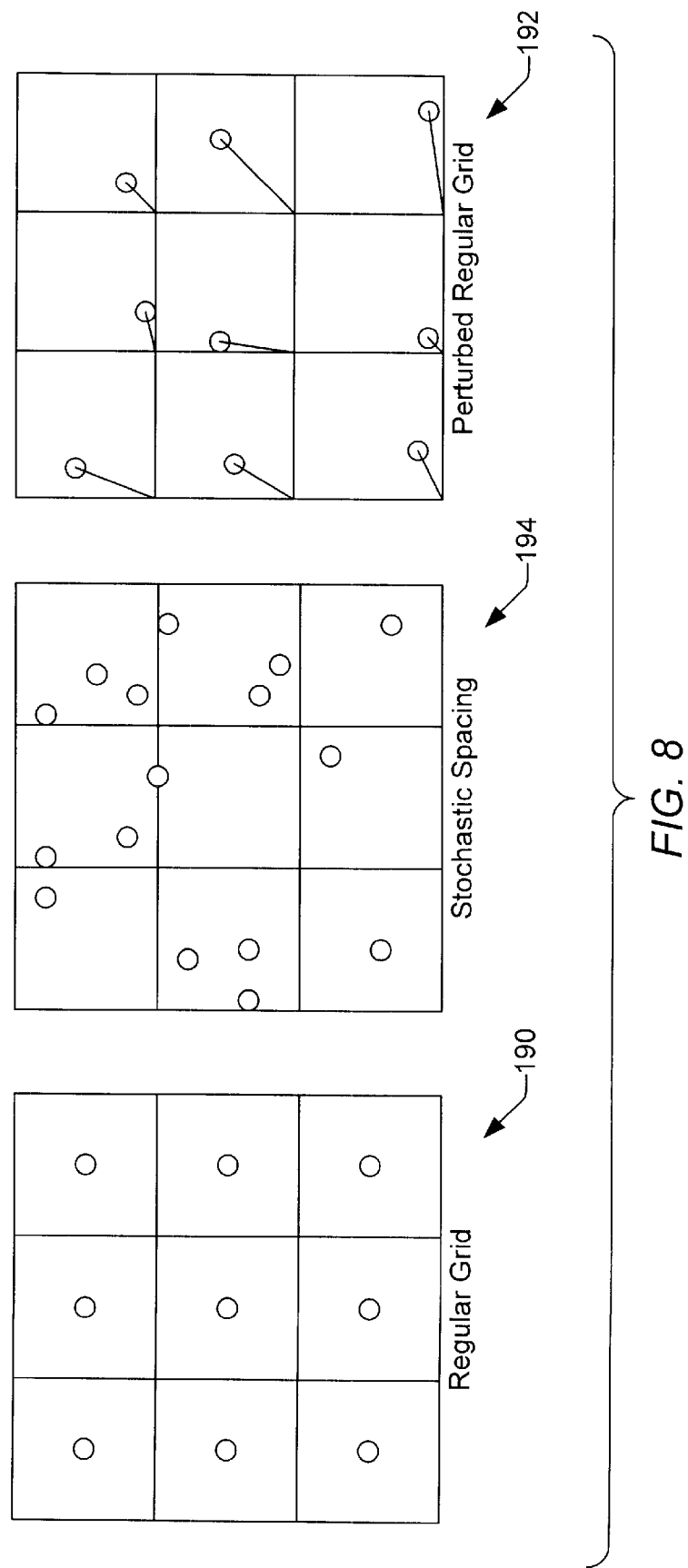
FIG. 8 illustrates details of three different embodiments of sample positioning schemes.

FIG. 8 illustrates a number of different sample positioning schemes. In regular grid positioning scheme 190, each sample is positioned at an intersection of a regularly-spaced grid. Note however, that as used herein the term "regular grid" or ("pre-defined grid") is not limited to square grids. Other types of grids are also considered "regular" as the term is used herein, including, but not limited to, rectangular grids, hexagonal grids, triangular grids, logarithmic grids, and semi-regular lattices such as Penrose tiling.

Perturbed regular grid positioning scheme 192 is based upon the previous definition of a regular grid. However, the samples in perturbed regular grid scheme 192 may be offset from their corresponding grid intersection. In one embodiment, the samples may be offset by a random angle (e.g., from 0° to 360°) and a random distance, or by random x and y offsets, which may or may not be limited to a predetermined range. The offsets may be generated in a number of ways, e.g., by hardware based upon a small number of seeds, looked up from a table, or by using a pseudo-random function. Once again, perturbed regular grid scheme 192 may be based on any type of regular grid (e.g., square, or hexagonal). A rectangular or hexagonal perturbed grid may be particularly desirable due to the geometric properties of these grid types.

Stochastic sample positioning scheme 194 represents a third potential type of scheme for positioning samples. Stochastic sample positioning involves randomly distributing the samples across a region (e.g., the displayed region on a display device or a particular window). Random positioning of samples may be accomplished through a number of different methods, e.g., using a random number generator such as an internal clock to generate pseudo-random numbers. Random numbers or positions may also be pre-calculated and stored in memory.

Various other position generation schemes can be used which are based on various statistical schemes which are designed to generate sample position that avoid each other according to some metric.

The position generation schemes discussed above may use pre-computed positions or positions generated on-the-fly during rendering, or a combination thereof.

Figure 9:
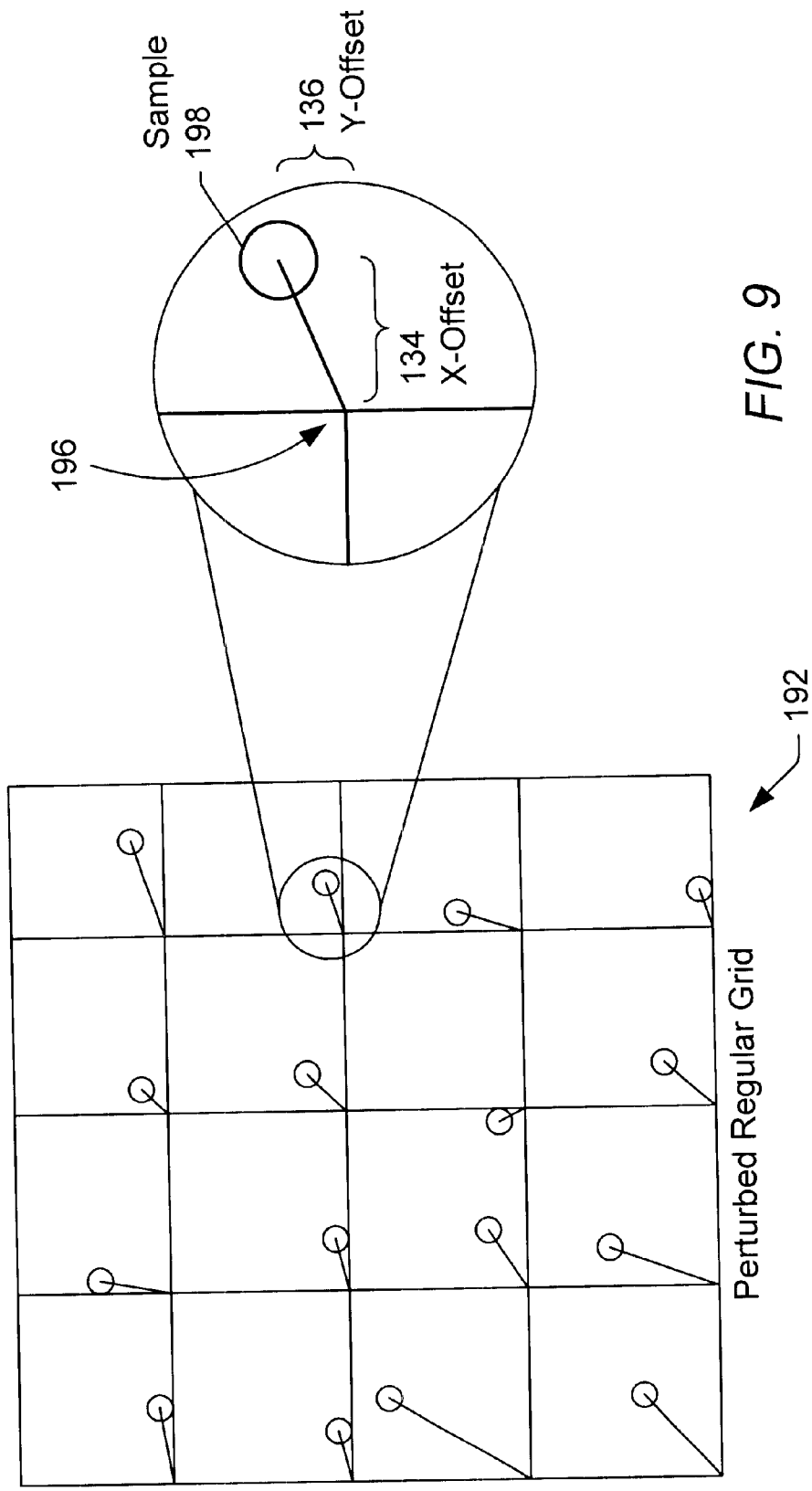
FIG. 9 illustrates details of one embodiment of a sample positioning scheme.

Turning now to FIG. 9, details of one embodiment of perturbed regular grid scheme 192 are shown. In this embodiment, samples are randomly offset from a regular square grid by x- and y-offsets. As the enlarged area shows, sample 198 has an x-offset 134 that specifies its horizontal displacement from its corresponding grid intersection point 196. Similarly, sample 198 also has a y-offset 136 that specifies its vertical displacement from grid intersection point 196. The random offset may also be specified by an angle and distance. As with the previously disclosed embodiment that utilized angles and distances, x-offset 134 and y-offset 136 may be limited to a particular minimum and or maximum value or range of values.

Figure 10:
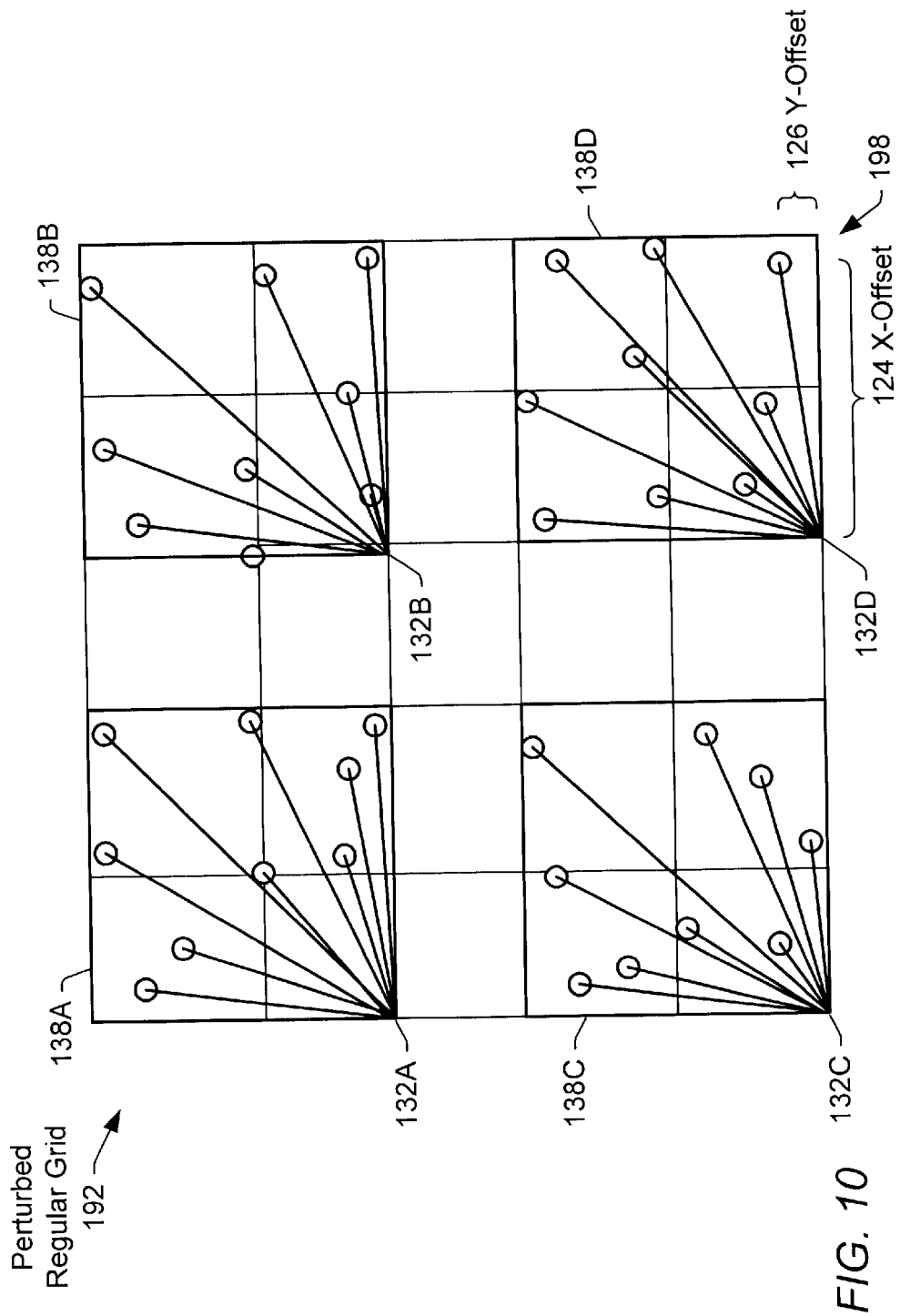
FIG. 10 illustrates details of another embodiment of a sample positioning scheme.

Turning now to FIG. 10, details of another embodiment of perturbed regular grid scheme 192 are shown. In this embodiment, the samples are grouped into "bins" 138A–D. In this embodiment, each bin comprises nine (i.e., 3×3) samples. Different bin sizes may be used in other embodiments (e.g., bins storing 2×2 samples or 4×4 samples). In the embodiment shown, each sample's position is determined as an offset relative to the position of the bin. The position of the bins may be defined as any convenient position related to the grid, e.g., the lower left-hand corners 132A–D as shown in the figure. For example, the position of sample 198 is determined by summing x-offset 124 and y-offset 126 to the x and y coordinates of the corner 132D of bin 138D. As previously noted, this may reduce the size of the sample position memory used in some embodiments.

Figure 11:
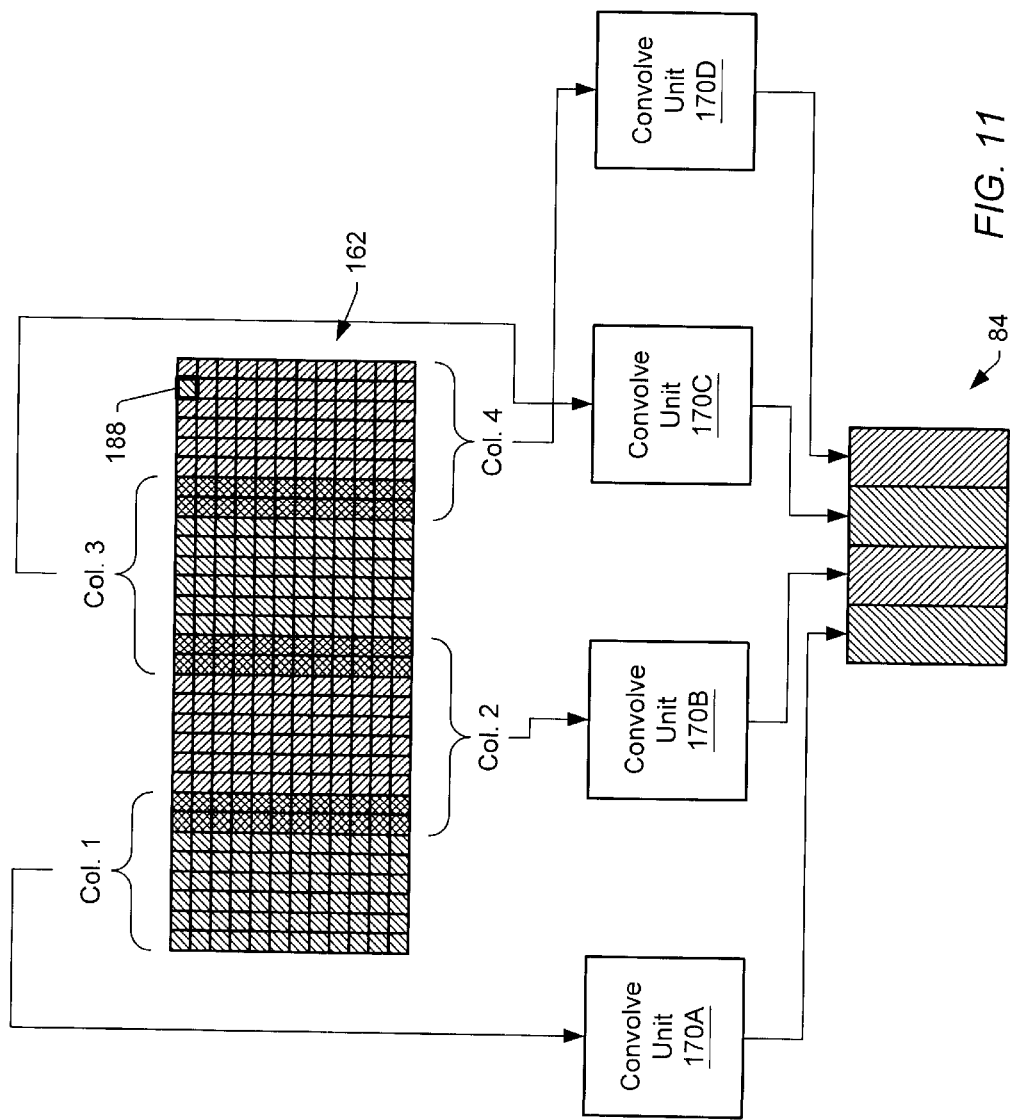
FIG. 11 illustrates details of method of converting samples to pixels in parallel.

FIG. 11—Converting Samples into Pixels

Turning now to FIG. 11, one possible method for rapidly converting samples stored in sample buffer 162 into pixels is shown. In this embodiment, the contents of sample buffer 162 are organized into columns (e.g., Cols. 1–4). Each column in sample buffer 162 may comprise a two-dimensional array of bins. The columns may be configured to horizontally overlap (e.g., by one or more bins), and each column may be assigned to a particular sample-to-pixel calculation unit 170A–D for the convolution process. The amount of the overlap may depend upon the extent of the filter being used. The example shown in the figure illustrates an overlap of two bins (each square such as square 188 represents a single bin comprising one or more samples). Advantageously, this configuration may allow sample-to-pixel calculation units 170A–D to work independently and in parallel, with each sample-to-pixel calculation unit 170A–D receiving and converting its own column. Overlapping the columns will eliminate visual bands or other artifacts appearing at the column boundaries for any operators larger than a pixel in extent.

Figure 11A:
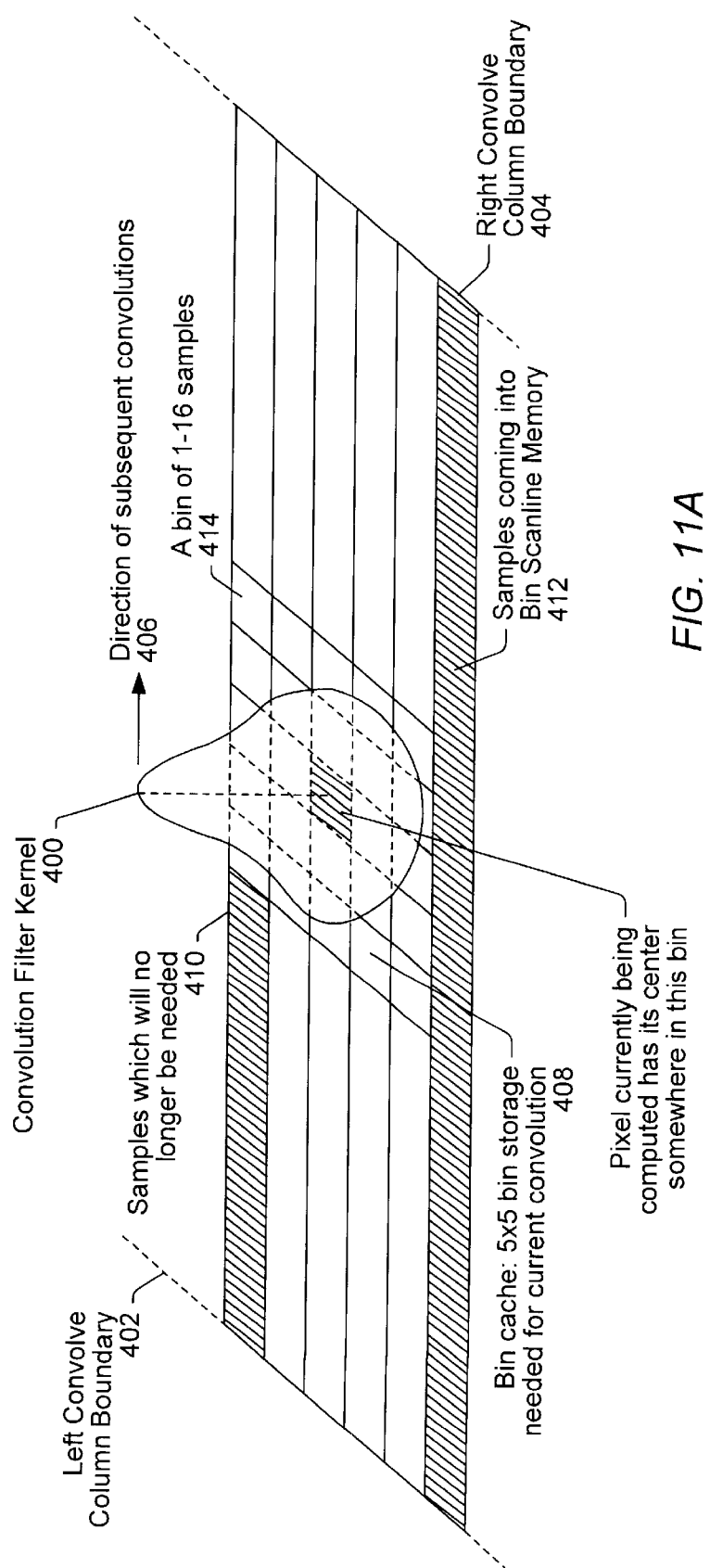
FIG. 11A illustrates more details of the embodiment from FIG. 11.

Turning now to FIG. 11A, more details of one embodiment of a method for reading the samples from a super-sampled sample buffer are shown. As the figure illustrates, the convolution filter kernel 400 travels across column 414 (see arrow 406) to generate output pixels. One or more sample-to-pixel calculation units 170 may implement the convolution filter kernel 400. A bin cache 408 may used to provide quick access to the samples that may potentially contribute to the output pixel. As the convolution process proceeds, bins are read from the super-sampled sample buffer and stored in bin cache 408. In one embodiment, bins that are no longer needed 410 are overwritten in the cache by new bins 412. As each pixel is generated, convolution filter kernel 400 shifts. Kernel 400 may be visualized as proceeding in a sequential fashion within the column in the direction indicated by arrow 406. When kernel 400 reaches the end of the column, it may shift down one or more rows of samples and then proceed again. Thus the convolution process proceeds in a scan line manner, generating one column of output pixels for display.

Figure 11B:
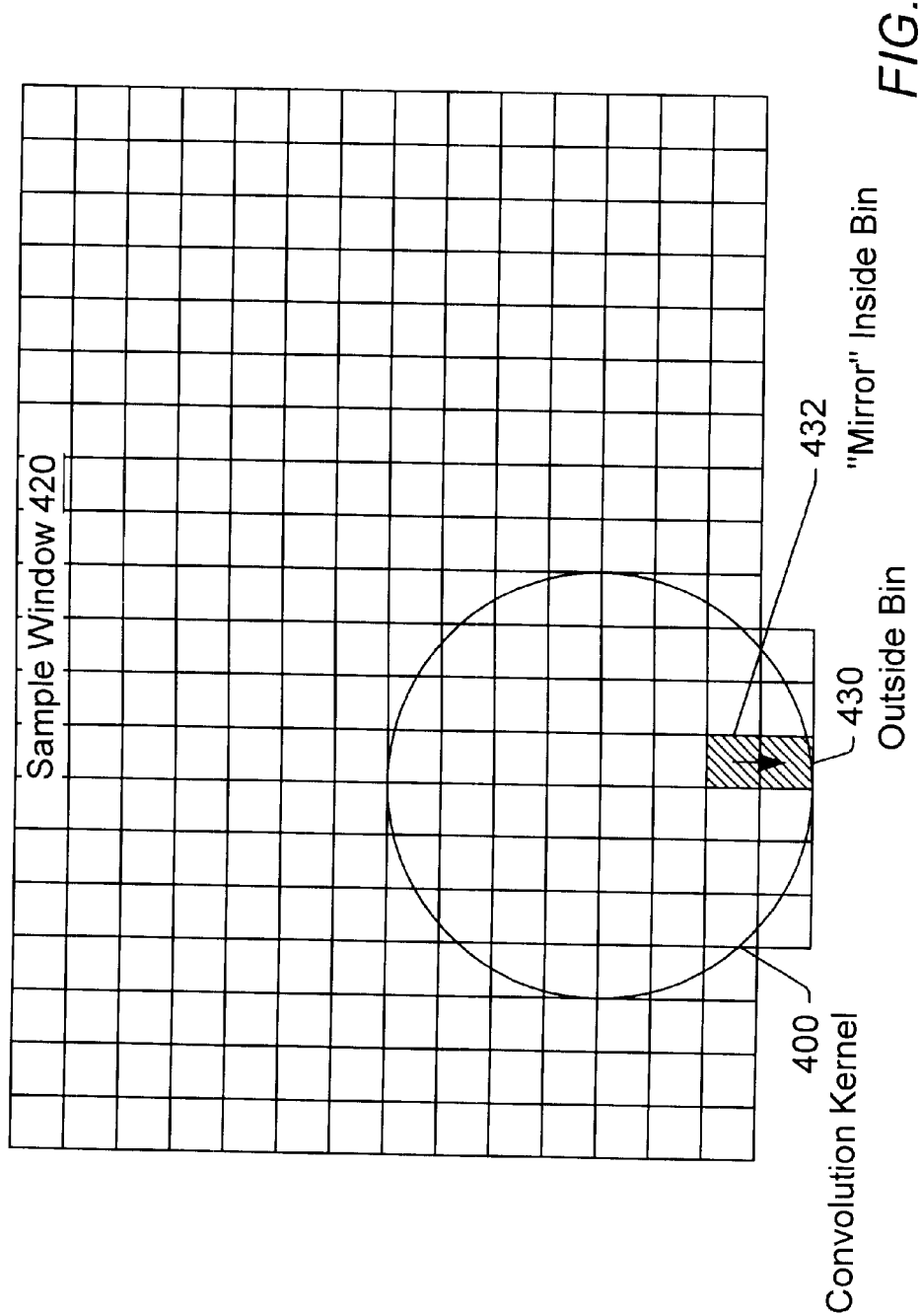
FIG. 11B illustrates details of one embodiment of a method for dealing with boundary conditions.

Turning now to FIG. 11B, a diagram illustrating potential border conditions is shown. In one embodiment, the bins that fall outside of sample window 420 may be replaced with samples having predetermined background colors specified by the user. In another embodiment, bins that fall outside the window are not used by setting their weighting factors to zero (and then dynamically calculating normalization coefficients). In yet another embodiment, the bins at the inside edge of the window may be duplicated to replace those outside the window. This is indicated by outside bin 430 being replaced by mirror inside bin 432.

Figure 12:
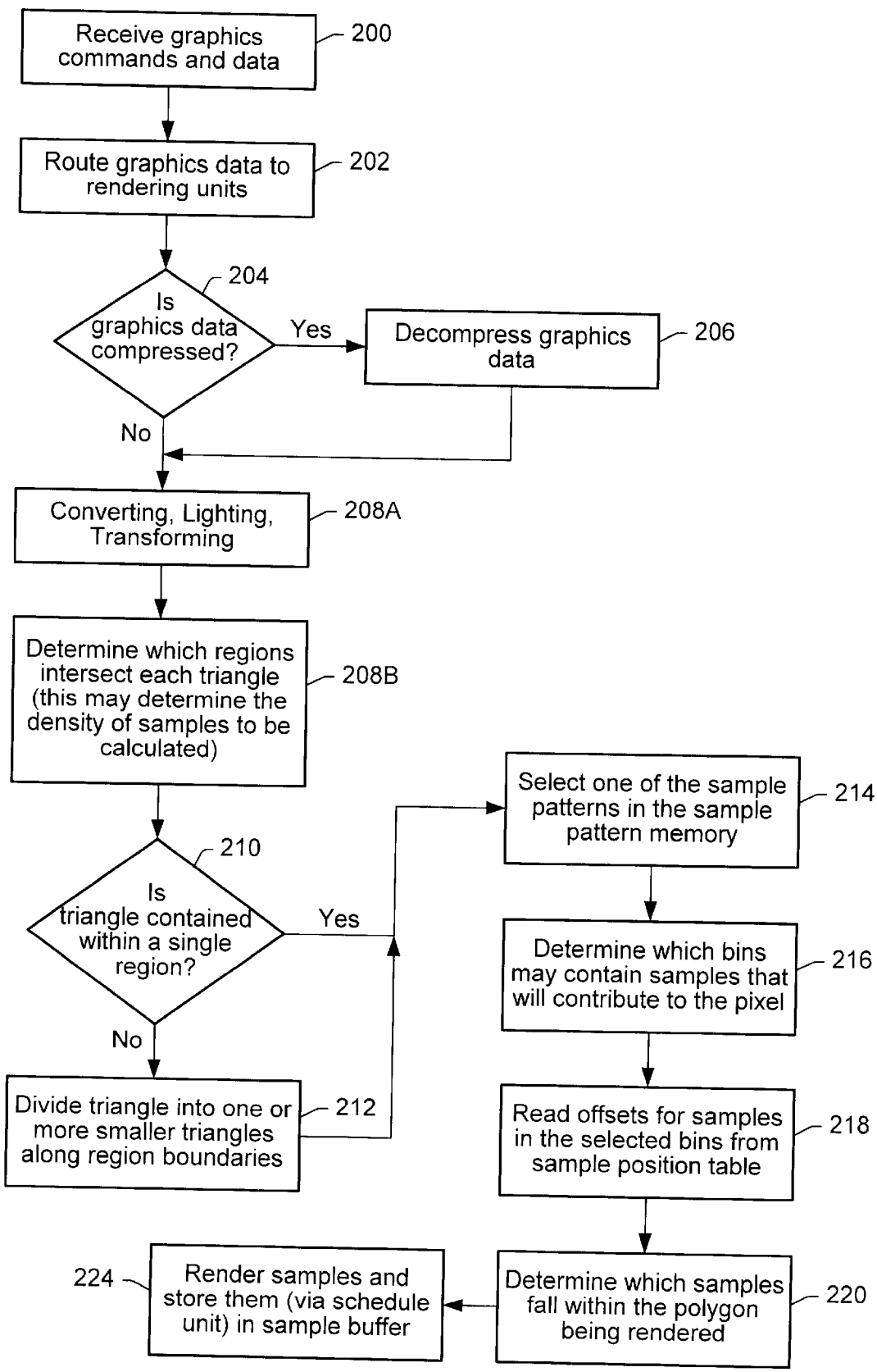
FIG. 12 is a flowchart illustrating one embodiment of a method for drawing samples into a super-sampled sample buffer.

FIG. 12—Rendering Sample Pixels into a Super-Sampled Sample Buffer

FIG. 12 is a flowchart of one embodiment of a method for drawing or rendering sample pixels into a super-sampled sample buffer. Certain of the steps of FIG. 12 may occur concurrently or in different orders. In this embodiment, the graphics system receives graphics commands and graphics data from the host CPU 102 or directly from main memory 106 (step 200). Next, the instructions and data are routed to one or more rendering units 150A–D (step 202). If the graphics data is compressed (step 204), then the rendering units 150A–D decompress the data into a useable format, e.g., triangles (step 206). Next, the triangles are processed, e.g., converted to screen space, lit, and transformed (step 208A). If the graphics system implements variable resolution super sampling, then the triangles are compared with the sample density region boundaries (step 208B). In variable-resolution super-sampled sample buffer implementations, different regions of the display device may be allocated different sample densities based upon a number of factors (e.g., the center of the attention on the screen as determined by eye or head tracking). Sample density regions are described in greater detail below (see section entitled Variable Resolution Sample buffer below). If the triangle crosses a region boundary (step 210), then the triangle may be divided into two smaller polygons along the region boundary (step 212). This may allow each newly formed triangle to have a single sample density. In one embodiment, the graphics system may be configured to simply use the entire triangle twice (i.e., once in each region) and then use a while bounding box to effectively clip the triangle.

Next, one of the sample position schemes (e.g., regular grid, perturbed regular grid, or stochastic) are selected from the sample position memory 184 (step 214). The sample position scheme will generally have been pre-programmed into the sample position memory 184, but may also be selected "on the fly". Based upon this sample position scheme and the sample density of the region containing the triangle, rendering units 150A–D determine which bins may contain samples located within the triangle's boundaries (step 216). The offsets for the samples within these bins are then read from sample position memory 184 (step 218). Each sample's position is then calculated using the offsets and is compared with the triangle's vertices to determine if the sample is within the triangle (step 220). Step 220 is discussed in greater detail below.

For each sample that is determined to be within the triangle, the rendering unit draws the sample by calculating the sample's color, alpha and other attributes. This may involve lighting calculation and interpolation based upon the color and texture map information associated with the vertices of the triangle. Once the sample is rendered, it may be forwarded to schedule unit 154, which then stores the sample in sample buffer 162 (step 224).

Note the embodiment of the method described above is used for explanatory purposes only and is not meant to be limiting. For example, in some embodiments the steps shown in the figure as occurring serially may be implemented in parallel. Furthermore, some steps may be reduced or eliminated in certain embodiments of the graphics system (e.g., steps 204–206 in embodiments that do not implement geometry compression or steps 210–212 in embodiments that do not implement a variable resolution super-sampled sample buffer).

Determination of Which Samples Reside Within the Polygon Being Rendered The comparison of which samples reside within the polygon being rendered may be performed in a number of different ways. In one embodiment, the deltas between the three vertices defining the triangle are first determined. For example, these deltas may be taken in the order of first to second vertex (v2–v1)=d12, second to third vertex (v3–v2)=d23, and third vertex back to the first vertex (v1–v3)=d31. These deltas form vectors, and each vector may be categorized as belonging to one of the four quadrants of the coordinate plane (e.g., by using the two sign bits of its delta X and Y coefficients). A third condition may be added determining whether the vector is an X-major vector or Y-major vector. This may be determined by calculating whether abs(delta$_{13}$x) is greater than abs(delta$_{13}$y).

Figure 12A:
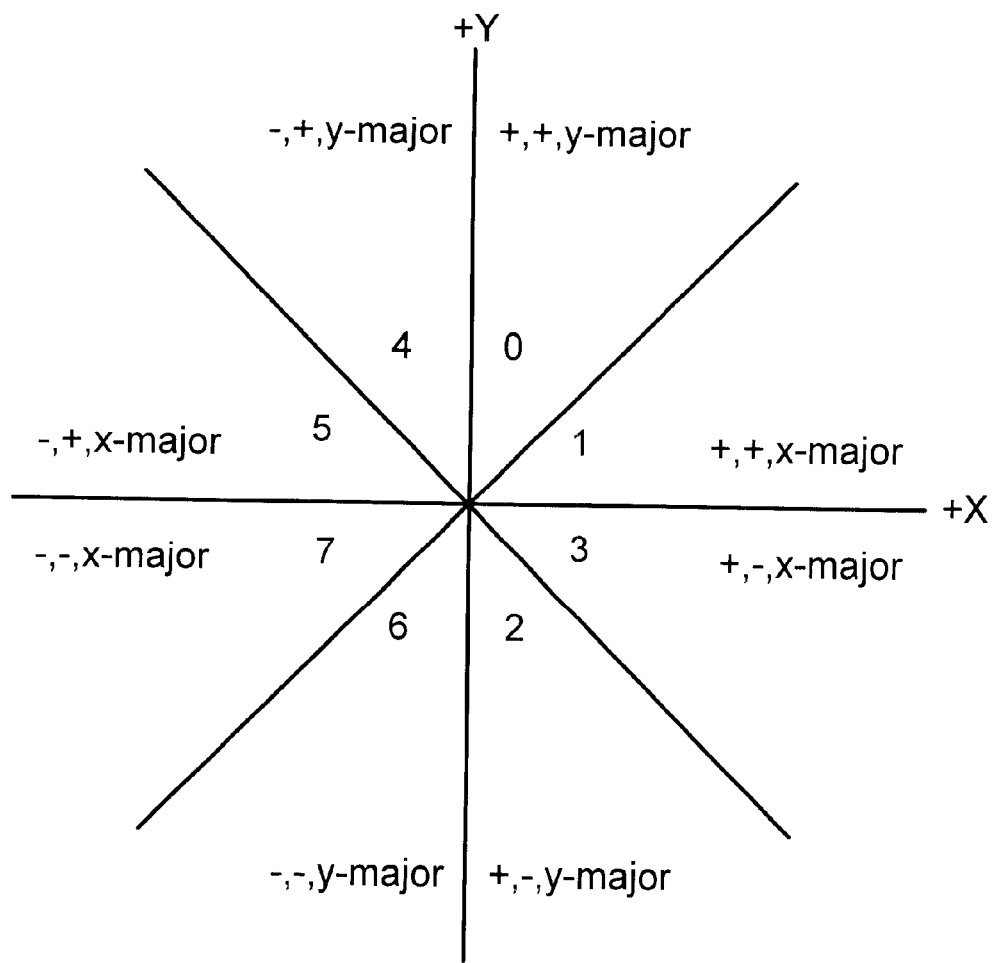
FIG. 12A illustrates one embodiment for coding triangle vertices.

Using these three bits of information, the vectors may each be categorized as belonging to one of eight different regions of the coordinate plane. If three bits are used to define these regions, then the X-sign bit (shifted left by two), the Y-sign bit (shifted left by one), and the X-major bit, may be used to create the eight regions as shown in FIG. 12A.

Next, three edge equations may be used to define the inside portion of the triangle. These edge equations (or half-plane equations) may be defined using slope-intercept form. To reduce the numerical range needed, both X-major and Y-major equation forms may be used (such that the absolute value of the slope value may be in the range of 0 to 1). Thus, the two edge equations are:

X-major: $y-m\cdot x-b<0$, when the point is below the line

Y-major: $x-m\cdot y-b<0$, when the point is to the left of the line

The X-major equations produces a negative versus positive value when the point in question is below the line, while the Y-major equation produces a negative versus positive value when the point in question is to the left of the line. Since which side of the line is the "accept" side is known, the sign bit (or the inverse of the sign bit) of the edge equation result may be used to determine whether the sample is on the "accept" side or not. This is referred to herein as the "accept bit". Thus, a sample is on the accept side of a line if:

X-major: $(y-m\cdot x-b<0)$<xor>accept

Y-major: $(x-m\cdot y-b<0)$<xor>accept

The accept bit may be calculated according to the following table, wherein cw designates whether the triangle is clockwise (cw=1) or counter—clockwise (cw=0):

1: accept=!cw
0: accept=cw
4: accept=cw
5: accept=cw
7: accept=cw
6: accept=!cw
2: accept=!cw
3: accept=!cw Tie breaking rules for this representation may also be implemented (e.g., coordinate axes may be defined as belonging to the positive octant). Similarly, X-major may be defined as owning all points that tie on the slopes.

In an alternate embodiment, the accept side of an edge may be determined by applying the edge equation to the third vertex of the triangle (the vertex that is not one of the two vertices forming the edge). This method may incur the additional cost of a multiply-add, which may not be used by the technique described above.

To determine the "faced-ness" of a triangle (i.e., whether the triangle is clockwise or counter-clockwise), the delta-directions of two edges of the triangle may be checked and the slopes of the two edges may be compared. For example, assuming that edge12 has a delta-direction of 1 and the second edge (edge23) has a delta-direction of 0, 4, or 5, then the triangle is counter-clockwise. If, however, edge23 has a delta-direction of 3, 2, or 6, then the triangle is clockwise. If edge23 has a delta-direction of 1 (i.e., the same as edge12), then comparing the slopes of the two edges breaks the tie (both are x-major). If edge12 has a greater slope, then the triangle is counter-clockwise. If edge23 has a delta-direction of 7 (the exact opposite of edge12), then again the slopes are compared, but with opposite results in terms of whether the triangle is clockwise or counter-clockwise.

The same analysis can be exhaustively applied to all combinations of edge12 and edge23 delta-directions, in every case determining the proper faced-ness. If the slopes are the same in the tie case, then the triangle is degenerate (i.e., with no interior area). It can be explicitly tested for and culled, or, with proper numerical care, it could be let through as it will cause no pixels to render. One special case is when a triangle splits the view plane, but that may be detected earlier in the pipeline (e.g., when front plane and back plane clipping are performed).

Note in most cases only one side of a triangle is rendered. Thus, after the faced-ness of a triangle is determined, if the face is the one to be rejected, then the triangle can be culled (i.e., subject to no further processing with no pixels generated). Further note that this determination of facedness only uses one additional comparison (i.e., of the slope of edge12 to that of edge23) beyond factors already computed. Many traditional approaches may utilize more complex computation (though at earlier stages of the set-up computation).

Figure 13:
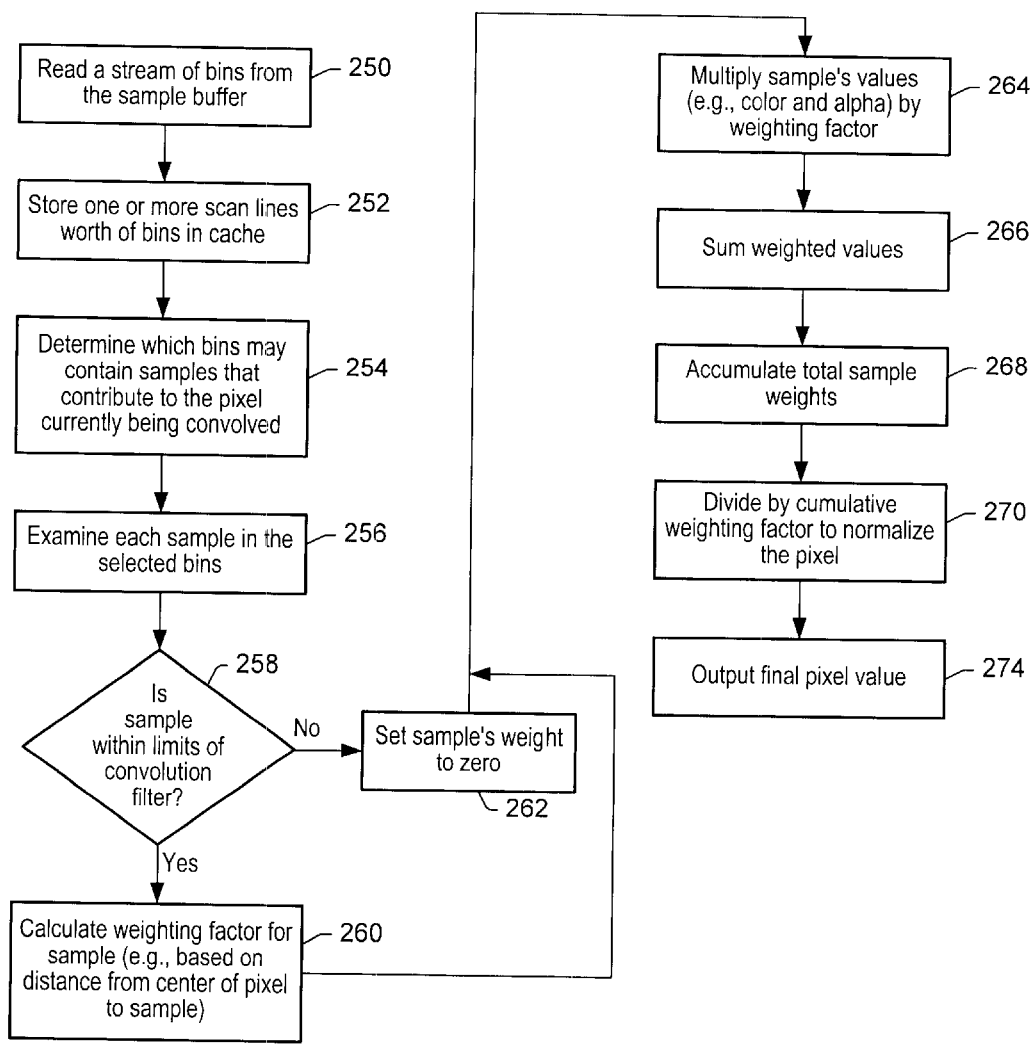
FIG. 13 illustrates one embodiment of a method for calculating pixels from samples.

FIG. 13—Generating Output Pixels by Selecting and Filtering Samples in the Super-Sampled Sample Buffer FIG. 13 is a flowchart of one embodiment of a method for selecting and filtering samples stored in the super-sampled sample buffer to generate output pixels. First, a stream of bins are read from the super-sampled sample buffer (step 250). These may be stored in one or more caches to allow the sample-to-pixel calculation units 170 easy access during the convolution process (step 252). Next, the bins are examined to determine which may contain samples that contribute to the output pixel currently being generated by the filter process (step 254). Each sample that is in a bin that may contribute to the output pixel is then individually examined to determine if the sample does indeed contribute (steps 256–258). This determination may be based upon the distance from the sample to the center of the output pixel being generated.

In one embodiment, the sample-to-pixel calculation units 170 may be configured to calculate this distance (i.e., the extent of the filter at sample's position) and then use it to index into a table storing filter weight values according to filter extent (step 260). In another embodiment, however, the potentially expensive calculation for determining the distance from the center of the pixel to the sample (which typically involves a square root function) is avoided by using distance squared to index into the table of filter weights. Alternatively, a function of x and y may be used in lieu of one dependent upon a distance calculation. In one embodiment, this may be accomplished by utilizing a floating point format for the distance (e.g., four or five bits of mantissa and three bits of exponent), thereby allowing much of the accuracy to be maintained while compensating for the increased range in values. In one embodiment, the table may be implemented in ROM. However, RAM tables may also be used. Advantageously, RAM tables may, in some embodiments, allow the graphics system to vary the filter coefficients on a per-frame basis. For example, the filter coefficients may be varied to compensate for known shortcomings of the display or for the user's personal preferences. The graphics system can also vary the filter coefficients on a screen area basis within a frame, or on a per-output pixel basis. Another alternative embodiment may actually calculate the desired filter weights for each sample using specialized hardware (e.g., multipliers and adders). The filter weight for samples outside the limits of the convolution filter may simply be multiplied by a filter weight of zero (step 262), or they may be removed from the calculation entirely.

Once the filter weight for a sample has been determined, the sample may then be multiplied by its filter weight (step 264). The weighted sample may then be summed with a running total to determine the final output pixel's color value (step 266). The filter weight may also be added to a running total pixel filter weight (step 268), which is used to normalize the filtered pixels. Normalization advantageously prevents the filtered pixels (e.g., pixels with more samples than other pixels) from appearing too bright or too dark by compensating for gain introduced by the convolution process. After all the contributing samples have been weighted and summed, the total pixel filter weight may be used to divide out the gain caused by the filtering (step 270). Finally, the normalized output pixel may be output for gamma correction, digital-to-analog conversion (if necessary), and eventual display (step 274).

Figure 14:
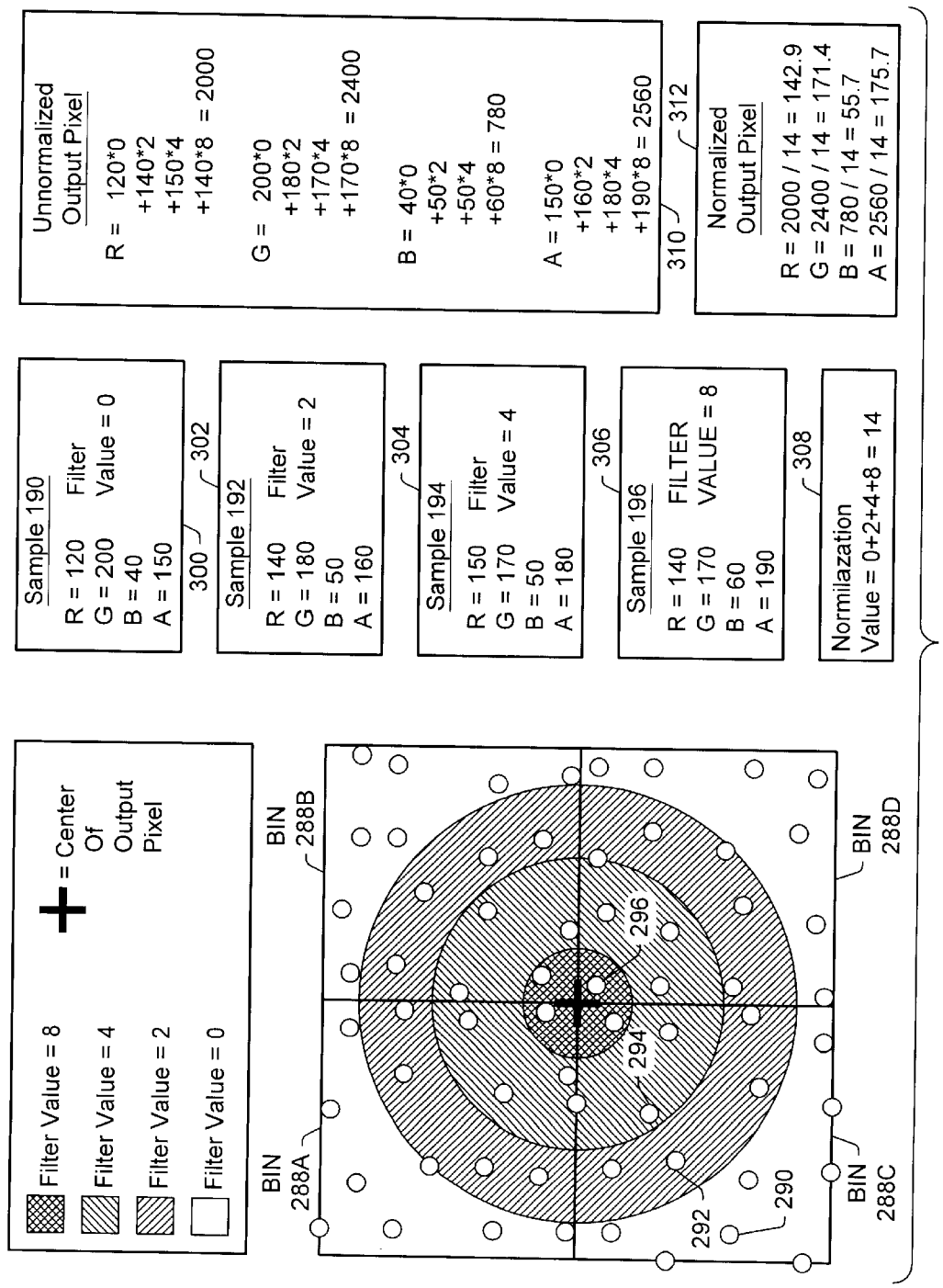
FIG. 14 illustrates details of one embodiment of a pixel convolution for an example set of samples.

FIG. 14—Example Output Pixel Convolution

FIG. 14 illustrates a simplified example of an output pixel convolution. As the figure shows, four bins 288A–D contain samples that may possibly contribute to the output pixel. In this example, the center of the output pixel, i.e., the center location where the filter is applied to generate a respective output pixel, is located at the boundary of bins 288A–288D. Each bin comprises sixteen samples, and an array of 2 four bins (2×2) is filtered to generate the output pixel. Assuming circular filters are used, the distance of each sample from the pixel center determines which filter value will be applied to the sample. For example, sample 296 is relatively close to the pixel center, and thus falls within the region of the filter having a filter value of 8. Similarly, samples 294 and 292 fall within the regions of the filter having filter values of 4 and 2, respectively. Sample 290, however, falls outside the maximum filter extent, and thus receives a filter value of 0. Thus sample 290 will not contribute to the output pixel's value. This type of filter ensures that the samples located the closest to the pixel center will contribute the most, while pixels located the far from the pixel center will contribute less to the final output pixel values. This type of filtering automatically performs anti-aliasing by smoothing any abrupt changes in the image (e.g., from a dark line to a light background). Another particularly useful type of filter for anti-aliasing is a windowed sinc filter. Advantageously, the windowed sinc filter contains negative lobes that resharpen some of the blended or "fuzzed" image. Negative lobes are areas where the filter causes the samples to subtract from the pixel being calculated. In contrast samples on either side of the negative lobe add to the pixel being calculated.

Example values for samples 290–296 are illustrated in boxes 300–308. In this example, each sample comprises red, green, blue and alpha values, in addition to the sample's positional data. Block 310 illustrates the calculation of each pixel component value for the non-normalized output pixel. As block 310 indicates, potentially undesirable gain is introduced into the final pixel values (i.e., an out pixel having a red component value of 2000 is much higher than any of the sample's red component values). As previously noted, the filter values may be summed to obtain normalization value 308. Normalization value 308 is used to divide out the unwanted gain from the output pixel. Block 312 illustrates this process and the final normalized example pixel values.

Note the values used herein were chosen for descriptive purposes only and are not meant to be limiting. For example, the filter may have a large number of regions each with a different filter value. In one embodiment, some regions may have negative filter values. The filter utilized may be a continuous function that is evaluated for each sample based on the sample's distance from the pixel center. Also note that floating point values may be used for increased precision. A variety of filters may be utilized, e.g., cylinder, cone, gaussian, Katmull-Rom, windowed sinc, Mitchell filter, box, tent.

Full-Screen Anti-aliasing

The vast majority of current 3D graphics systems only provide real-time anti-aliasing for lines and dots. While some systems also allow the edge of a polygon to be "fuzzed", this technique typically works best when all polygons have been pre-sorted in depth. This may defeat the purpose of having general-purpose 3D rendering hardware for most applications (which do not depth pre-sort their polygons). In one embodiment, graphics system 112 may be configured to implement full-screen anti-aliasing by stochastically sampling up to sixteen samples per output pixel, filtered by a 4×4-convolution filter.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system comprising:
   a graphics processor operable to render a plurality of samples, wherein the graphics processor is operable to utilize position information in rendering each of the samples;
   a sample buffer coupled to the graphics processor for storing the samples;
   wherein, for each sample, the position information comprises one or more offset values, wherein the one or more offset values are relative to pre-defined positions in the sample buffer; and
   a sample-to-pixel calculation unit coupled to the sample buffer, wherein the sample-to-pixel calculation unit is operable to select samples using the position information and filter the selected samples to generate output pixels for display.

2. The graphics system of claim 1, wherein the sample-to-pixel calculation unit uses the one or more offset values to generate positions of the samples;
   wherein the sample-to-pixel calculation unit uses the positions in selecting samples for filtering.

3. The graphics system of claim 1, wherein, for each sample, the one or more offset values comprise an x-offset and a y-offset.

4. The graphics system of claim 1, wherein the one or more offset values comprise offset values relative to a pre-defined grid.

5. The graphics system of claim 1, wherein the graphics processor is operable to render the samples according to sample positions calculated by combining the one or more offset values with coordinates selected from the group comprising: predetermined bin coordinates and predetermined pixel center coordinates.

6. The graphics system of claim 1, further comprising:
   a memory coupled to the sample-to-pixel calculation unit which stores the offset values for each of the samples;
   wherein the sample-to-pixel calculation unit is operable to access the memory to determine the offset values of the samples.

7. The graphics system of claim 6,
   wherein the memory is a look-up table memory;
   wherein the sample-to-pixel calculation unit is operable to index into the look-up table memory to determine the offset values of the samples.

8. The graphics system of claim 6, wherein the memory is addressable using addresses;
   wherein the memory stores a number of offset values which is less than a number of samples stored in the sample buffer;
   wherein the sample-to-pixel calculation unit is operable to manipulate bits in the addresses to obtain different offset values for samples.

9. The graphics system of claim 1, further comprising:
   a first memory coupled to the graphics processor which stores the position information for each of the samples;
   wherein the graphics processor uses the first memory in rendering the samples into the sample buffer;
   a second memory coupled to the sample-to-pixel calculation unit which stores the position information for each of the samples;
   wherein the sample-to-pixel calculation unit is operable to access the second memory to determine the position information of the samples.

10. The graphics system of claim 9,
    wherein the first memory is operable to transfer current position information for a current frame to the second memory;
    wherein the sample-to-pixel calculation unit is operable to use the second memory to determine the current position information of the samples;
    wherein the graphics processor is operable to store subsequent position information for a subsequent frame into the first memory contemporaneously with the sample-to-pixel calculation unit using the second memory to determine the current position information of the samples for the current frame.

11. The graphics system of claim 1, wherein the samples are stored in the sample buffer according to bins, wherein each respective bin defines a region in the sample buffer in which samples in the respective bin are located;
    wherein the one or more offset values comprise offset values relative to a bin, wherein a position of each sample within a respective bin is determined by using the one or more offset values associated with the sample and the sample's bin position.

12. The graphics system of claim 11, wherein the samples are stored in the sample buffer according to a bin ordering, wherein, for a respective bin, the bin ordering indicates a position of the samples in the respective bin;
    wherein, for a respective sample, the sample-to-pixel calculation unit is operable to generate the position of the respective sample based at least partly on the bin ordering of the respective sample within its bin.

13. The graphics system of claim 12, further comprising:
    a memory coupled to the sample-to-pixel calculation unit which stores the offset values for each of the samples, wherein the offset values are stored in the memory according to the bin ordering of the samples;
    wherein the sample-to-pixel calculation unit is operable to use the bin ordering of the samples in the bins to index into the memory to determine the offset values of the samples.

14. The graphics system of claim 13, wherein the memory is addressable using addresses;
    wherein the memory stores a number of offset values which is less than a number of samples stored in the sample buffer;
    wherein the sample-to-pixel calculation unit is operable to manipulate bits in said addresses to obtain different offset values for samples in said bins.

15. The graphics system of claim 13, wherein the memory stores a number of offset values corresponding to one bin of the sample buffer;
    wherein the sample-to-pixel calculation unit is operable to reuse said offset values for each bin of the sample buffer.

16. The graphics system of claim 12, further comprising:

a first memory coupled to the graphics processor which stores position information for each of the samples according to said bin ordering;

wherein the graphics processor uses the first memory in rendering the samples into the sample buffer according to said bin ordering;

a second memory coupled to the sample-to-pixel calculation unit which stores the position information for each of the samples according to said bin ordering;

wherein the sample-to-pixel calculation unit is operable to use the bin ordering of the samples in the bins to index into the second memory to determine the position information of the samples.

17. The graphics system of claim 16, wherein the first memory is operable to transfer current position information for a current frame to the second memory;

wherein the sample-to-pixel calculation unit is operable to use the second memory to determine the current position information of the samples;

wherein the graphics processor is operable to store subsequent position information for a subsequent frame into the first memory contemporaneously with the sample-to-pixel calculation unit using the second memory to determine the current position information of the samples for the current frame.

18. The graphics system of claim 1, wherein the sample buffer stores the position information with the samples.

19. The graphics system of claim 1, further comprising:

a sample position memory coupled to the graphics processor which stores the position information;

wherein the sample position memory is programmable.

20. The graphics system of claim 1, further comprising:

a sample position memory coupled to the graphics processor which stores the position information;

wherein the sample position memory is double-buffered.

21. The graphics system of claim 1, wherein the graphics processor generates the position information.

22. The graphics system of claim 1, wherein said position information is generated according to one or more sample position schemes selected from: regular grid based position generation; stochastic based position generation; perturbed regular grid position generation, and pre-computed position generation.

23. The graphics system of claim 1, wherein the position information is programmable;

wherein the graphics processor operable to render the plurality of samples at programmable positions in the sample buffer.

24. The graphics system of claim 23, wherein the position information is programmable on a per frame basis.

25. The graphics system of claim 23, wherein the position information is programmable on a per bin basis.

26. The graphics system of claim 1, wherein the sample-to-pixel calculation unit is operable to select and filter stored samples and generate output pixels which are provided directly to a display with no frame buffer therebetween.

27. The graphics system of claim 1, wherein the sample-to-pixel calculation unit is configured to filter samples to form output pixels on a real time basis.

28. The graphics system of claim 1, wherein the sample-to-pixel calculation unit is configured to filter samples to form output pixels on an on-the-fly basis.

29. A graphics system comprising:

a graphics processor operable to render a plurality of samples, wherein the graphics processor is also operable to generate position information for each of the samples;

a sample buffer coupled to the graphics processor for storing the samples, wherein the sample buffer also stores the position information with the samples; and a sample-to-pixel calculation unit coupled to said sample buffer, wherein the sample-to-pixel calculation unit is operable to select samples using the position information and filter the selected samples to generate output pixels for display.

30. The graphics system of claim 29, wherein the position information for each respective sample is stored in the sample buffer with the respective sample.

31. The graphics system of claim 29, wherein, for each sample, the position information comprises one or more offset values, wherein the offset values are relative to pre-defined positions in the sample buffer.

32. The graphics system of claim 31, wherein, for each sample, the one or more offset values comprise an x-offset and a y-offset.

33. The graphics system of claim 29, wherein the samples are stored in the sample buffer according to bins;

wherein each respective bin defines a region in the sample buffer in which samples in the respective bin are located;

wherein, for each sample, the position information comprises one or more offset values, wherein the one or more offset values comprise offset values relative to a bin;

wherein a position of each sample within a respective bin is determined by using the one or more offsets associated with the sample and the sample's bin position.

34. The graphics system of claim 29, wherein the position information comprises coordinate values relative to a sample buffer coordinate system.

35. The graphics system of claim 29, wherein the position information is programmable;

wherein the graphics processor operable to render the plurality of samples at programmable positions in the sample buffer.

36. The graphics system of claim 29, wherein the sample-to-pixel calculation unit is operable to select and filter stored samples and generate output pixels which are provided directly to a display with no frame buffer therebetween.

37. A graphics system comprising:

a graphics processor operable to render a plurality of samples, wherein the graphics processor is operable to utilize position information in rendering each of the samples;

a sample buffer coupled to the graphics processor for storing said samples;

a sample position memory coupled to the graphics processor which stores the position information for the samples, wherein the sample position memory is programmable;

wherein the graphics processor is operable to render the plurality of samples at programmable positions in the sample buffer; and a sample-to-pixel calculation unit coupled to the sample buffer and to the sample position memory, wherein the sample-to-pixel calculation unit is operable to select samples using the position information and filter the selected samples to generate output pixels for display.

38. The graphics system of claim 37, wherein the positions are programmable on one of a per frame basis or a per bin basis.

39. The graphics system of claim 37, wherein, for each sample, the position information comprises one or more offset values, wherein the offset values are relative to pre-defined positions in the sample buffer.

40. The graphics system of claim 37, wherein the samples are stored in the sample buffer according to bins;

wherein each respective bin defines a region in the sample buffer in which samples in the respective bin are located;

wherein, for each sample, the position information comprises one or more offset values, wherein the one or more offset values comprise offset values relative to a bin;

wherein a position of each sample within a respective bin is determined by using the one or more offsets associated with the sample and the sample's bin position.

41. The graphics system of claim 37, wherein the position information comprises coordinate values relative to a sample buffer coordinate system.

42. The graphics system of claim 37, wherein the sample-to-pixel calculation unit is operable to select and filter stored samples and generate output pixels which are provided directly to a display with no frame buffer therebetween.

43. A graphics system comprising:

a graphics processor operable to render a plurality of samples, wherein the graphics processor is operable to utilize position information in rendering each of the samples;

a sample buffer coupled to said graphics processor for storing said samples;

wherein the samples are stored in the sample buffer according to bins;

wherein, for each sample, the position information comprises one or more offset values, wherein the offset values are relative to bins in the sample buffer; and a sample-to-pixel calculation unit coupled to the sample buffer, wherein the sample-to-pixel calculation unit is operable to select samples using the position information and filter the selected samples to generate output pixels for display.

44. The graphics system of claim 43, wherein each respective bin defines a region in the sample buffer in which samples in the respective bin are located;

wherein a position of each sample within a respective bin is determined by using the one or more offset values associated with the sample and the sample's bin position.

45. A method for generating pixels for display in a graphics system, the method comprising:

generating position information for each of a plurality of samples, wherein, for each sample, the position information comprises one or more offset values, wherein the offset values are relative to pre-defined positions in a sample buffer;

rendering the plurality of samples using the position information and storing the samples into the sample buffer;

generating output pixels in response to the plurality of samples stored in the sample buffer, wherein said generating includes selecting samples using the position information and filtering the selected samples to generate output pixels for display.

46. The method of claim 45, wherein said rendering includes using the one or more offset values to generate positions of the samples;

wherein said rendering includes using the positions to calculate sample information for the samples;

wherein said generating output pixels includes using the one or more offset values to generate positions of the samples;

wherein said generating output pixels uses the positions in selecting samples for filtering.

47. The method of claim 45, wherein, for each sample, the one or more offset values comprise an x-offset and a y-offset.

48. The method of claim 45, wherein the one or more offset values comprise offset values relative to a pre-defined grid.

49. The method of claim 45, wherein the one or more offset values are useable to generate positions of the samples;

wherein the positions are calculated by combining the one or more offset values with coordinates selected from the group comprising: pre-determined bin coordinates and pre-determined pixel center coordinates.

50. The method of claim 45, further comprising:

storing the offset values for each of the samples in a memory;

wherein said rendering includes accessing the memory to determine the offset values of the samples;

wherein said generating output pixels includes accessing the memory to determine the offset values of the samples.

51. The method of claim 50, wherein the memory is a look-up table memory;

wherein said generating output pixels includes indexing into the look-up table memory to determine the offset values of the samples.

52. The method of claim 50, wherein the memory is addressable using addresses;

wherein said storing the offset values comprises storing a number of offset values which is less than a number of samples stored in the sample buffer;

wherein said generating output pixels includes manipulating bits in the addresses to obtain different offset values for samples in said bins.

53. The method of claim 45, further comprising:

storing the position information for each of the samples in a first memory;

wherein said rendering includes accessing the position information from the first memory in rendering the samples into the sample buffer;

storing the position information for each of the samples in a second memory;

wherein said generating output pixels includes accessing the position information from the second memory to determine the position information of the samples.

54. The method of claim 53, further comprising:

the first memory transferring current position information for a current frame to the second memory;

said generating output pixels accessing the second memory to determine the current position information of the samples;

wherein said storing the position information for each of the samples in the first memory comprises storing subsequent position information for a subsequent frame into the first memory contemporaneously with said generating output pixels accessing the second memory to determine the current position information of the samples for the current frame.

55. The method of claim 45, wherein said storing comprises storing the samples in the sample buffer according to bins;
wherein the one or more offset values comprise offset values relative to a bin.

56. The method of claim 55, wherein each respective bin defines a region in the sample buffer in which samples in the respective bin are located;
wherein a position of each sample within a respective bin is determined by using the one or more offsets associated with the sample and the sample's bin position.

57. The method of claim 55, wherein said storing comprises storing the samples in the sample buffer according to a bin ordering, wherein the bin ordering indicates a position of the samples in respective bins;
wherein, for a respective sample, said generating output pixels includes generating the position of the respective sample based at least partly on the bin ordering of the respective sample within its bin.

58. The method of claim 57, further comprising:
storing the offset values for each of the samples in a memory, wherein the offset values are stored in the memory according to said bin ordering of the samples;
wherein said generating output pixels includes using the bin ordering of the samples in the bins to index into the memory to determine the offset values of the samples.

59. The method of claim 58, wherein the memory is addressable using addresses;
wherein said storing the offset values comprises storing a number of offset values which is less than a number of samples stored in the sample buffer;
wherein said generating output pixels includes manipulating bits in said addresses to obtain different offset values for samples in said bins.

60. The method of claim 58, wherein said storing the offset values comprises storing a number of offset values corresponding to one bin of the sample buffer;
wherein said generating output pixels includes reusing said offset values for each bin of the sample buffer.

61. The method of claim 45, further comprising:
storing the position information with the samples in the sample buffer.

62. The method of claim 45, further comprising:
storing the position information in a sample position memory; and
programming the sample position memory to receive new position information on a per frame basis.

63. The method of claim 45, wherein said generating output pixels includes selecting and filtering stored samples and generating output pixels which are provided directly to a display with no frame buffer therebetween.

64. A method for generating pixels for display in a graphics system, the method comprising:
generating position information for each of a plurality of samples;
rendering the plurality of samples into a sample buffer according to the position information;
storing the position information with the samples in the sample buffer, wherein, for each sample, the position information comprises one or more offset values, wherein the offset values are relative to pre-defined positions in the sample buffer;
generating output pixels in response to the plurality of samples stored in the sample buffer, wherein said generating includes selecting samples using the position information and filtering the selected samples to generate output pixels for display.

65. A method for generating pixels for display in a graphics system, the method comprising:
generating position information for each of a plurality of samples;
rendering the plurality of samples into a sample buffer according to the position information;
storing the position information in a sample position memory, wherein, for each sample, the position information comprises one or more offset values, wherein the offset values are relative to pre-defined locations in the sample buffer;
generating output pixels in response to the plurality of samples stored in the sample buffer, wherein said generating includes selecting samples using the position information and filtering the selected samples to generate output pixels for display.

66. A graphics system comprising:
a graphics processor operable to render a plurality of samples;
a sample buffer coupled to said graphics processor for storing the samples;
wherein the graphics processor is operable to store samples into the sample buffer according to bins;
wherein the samples are stored in the sample buffer according to a bin ordering, wherein the bin ordering indicates a position of the samples in the respective bin; and
a sample-to-pixel calculation unit coupled to said sample buffer, wherein the sample-to-pixel calculation unit is operable to select samples according to the position of the samples and filter the selected samples to generate output pixels for display.

67. The graphics system of claim 66, wherein, for a respective sample, the sample-to-pixel calculation unit is operable to generate the position of the respective sample at least partly based on the bin ordering of the respective sample within the respective bin.

68. The graphics system of claim 66, further comprising:
a memory coupled to the sample-to-pixel calculation unit which stores position information for each of the samples according to said bin ordering;
wherein the sample-to-pixel calculation unit is operable to use the bin ordering of the samples in the bins to index into the memory to determine the position information of the samples;
wherein the sample-to-pixel calculation unit uses the position information to select the samples.

69. The graphics system of claim 68, wherein, for each sample, the position information comprises one or more offset values, wherein the offset values are relative to pre-defined positions in the sample buffer.

70. The graphics system of claim 68, wherein, for each sample, the position information comprises one or more offset values, wherein the offset values are relative to the bins.

71. The graphics system of claim 66, further comprising:
a memory coupled to the sample-to-pixel calculation unit which stores offset values for each of the samples, wherein the offset values are relative to the bins, wherein the offset values are stored in the memory according to said bin ordering of the samples;

wherein the sample-to-pixel calculation unit is operable to use the bin ordering of the samples in the bins to index into the memory to determine the offset values of the samples;

wherein the sample-to-pixel calculation unit uses the position information to select the samples.

72. The graphics system of claim 71, wherein the memory is addressable using addresses;

wherein the memory stores a number of offset values which is less than a number of samples stored in the sample buffer;

wherein the sample-to-pixel calculation unit is operable to manipulate bits in said addresses to obtain different offset values for samples in said bins.

73. The graphics system of claim 71, wherein the memory stores a number of offset values corresponding to one bin of the sample buffer;

wherein the sample-to-pixel calculation unit is operable to reuse said offset values for each bin of the sample buffer.

74. The graphics system of claim 66, further comprising:

a first memory coupled to the graphics processor which stores position information for each of the samples according to said bin ordering;

wherein the graphics processor uses the first memory in rendering the samples into the sample buffer according to said bin ordering;

a second memory coupled to the sample-to-pixel calculation unit which stores the position information for each of the samples according to said bin ordering;

wherein the sample-to-pixel calculation unit is operable to use the bin ordering of the samples in the bins to index into the second memory to determine the position information of the samples;

wherein the sample-to-pixel calculation unit uses the position information to select the samples.

75. The graphics system of claim 74, wherein the first memory is operable to transfer current position information for a current frame to the second memory;

wherein the sample-to-pixel calculation unit is operable to use the second memory to determine the current position information of the samples;

wherein the graphics processor is operable to store position information for a subsequent frame into the first memory contemporaneously with the sample-to-pixel calculation unit using the second memory to determine the current position information of the samples for the current frame.

76. The graphics system of claim 66, wherein the sample-to-pixel calculation unit is operable to select and filter stored samples and generate output pixels which are provided directly to a display with no frame buffer therebetween.

* * * * *